(12) United States Patent
Chen et al.

(10) Patent No.: US 11,050,933 B2
(45) Date of Patent: Jun. 29, 2021

(54) DEVICE AND METHOD FOR DETERMINING A CENTER OF A TRAILER TOW COUPLER

(71) Applicant: Continental Automotive Systems, Inc., Auburn Hills, MI (US)

(72) Inventors: Joyce Chen, West Bloomfield, MI (US); Xin Yu, Troy, MI (US); Julien Ip, Madison Heights, MI (US)

(73) Assignee: Continenal Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/395,190

(22) Filed: Apr. 25, 2019

(65) Prior Publication Data
US 2019/0335100 A1 Oct. 31, 2019

Related U.S. Application Data

(60) Provisional application No. 62/663,354, filed on Apr. 27, 2018.

(51) Int. Cl.
*H04N 5/232* (2006.01)
*G06K 9/00* (2006.01)
(Continued)

(52) U.S. Cl.
CPC ..... *H04N 5/23238* (2013.01); *G06K 9/00791* (2013.01); *G06K 9/4609* (2013.01);
(Continued)

(58) Field of Classification Search
None
See application file for complete search history.

(56) References Cited

U.S. PATENT DOCUMENTS

2004/0258307 A1\* 12/2004 Viola ................... G06K 9/4614
382/190
2005/0058337 A1\* 3/2005 Fujimura ................. G06K 9/32
382/159
(Continued)

FOREIGN PATENT DOCUMENTS

DE 102012018914 A1 3/2014
DE 102016210376 A1 12/2016
(Continued)

OTHER PUBLICATIONS

International Search Report and the Written Opinion of the International Searching Authority dated Jun. 27, 2019 for corresponding PCT Application No. PCT/US2019/029310.

*Primary Examiner* — Frederick D Bailey

(57) ABSTRACT

A method for determining a location of a target positioned behind a tow vehicle is provided. The method includes receiving images from a camera positioned on a back portion of the tow vehicle. The images include the target. The method includes applying one or more filter banks to the images. The method also includes determining a region of interest within each image based on the applied filter banks. The region of interest includes the target. The method also includes identifying the target within the region of interest and determining a target location of the target including a location in a real-world coordinate system. The method also includes transmitting instructions to a drive system supported by the vehicle. The instructions cause the tow vehicle to autonomously maneuver towards the location in the real-world coordinate system.

20 Claims, 13 Drawing Sheets

(51) Int. Cl.
*G06K 9/62* (2006.01)
*G06T 7/73* (2017.01)
*G06K 9/46* (2006.01)

(52) U.S. Cl.
CPC .............. *G06K 9/6256* (2013.01); *G06T 7/74* (2017.01); *G06T 2207/30252* (2013.01)

(56) References Cited

U.S. PATENT DOCUMENTS

| | | | |
|---|---|---|---|
| 2006/0045322 A1* | 3/2006 | Clarke | G06K 9/186 382/137 |
| 2008/0037877 A1* | 2/2008 | Jia | G06F 16/583 382/224 |
| 2010/0097458 A1* | 4/2010 | Zhang | G06K 9/00798 348/119 |
| 2010/0265048 A1* | 10/2010 | Lu | B60Q 9/005 340/435 |
| 2011/0206275 A1* | 8/2011 | Takahashi | G06T 7/74 382/159 |
| 2014/0146205 A1* | 5/2014 | Xu | H04N 5/23267 348/239 |
| 2015/0312481 A1* | 10/2015 | Gritti | H04N 5/23238 348/36 |
| 2015/0321666 A1 | 11/2015 | Talty et al. | |
| 2018/0081370 A1* | 3/2018 | Miller | B60W 10/20 |
| 2018/0101967 A1* | 4/2018 | Hong | H04N 19/51 |
| 2018/0121988 A1* | 5/2018 | Hiranandani | G06K 9/6202 |

FOREIGN PATENT DOCUMENTS

| | | |
|---|---|---|
| DE | 102017111530 A1 | 11/2017 |
| DE | 102017114122 A1 | 12/2017 |
| EP | 3299191 A1 | 3/2018 |
| WO | 2017112444 A1 | 6/2017 |

* cited by examiner

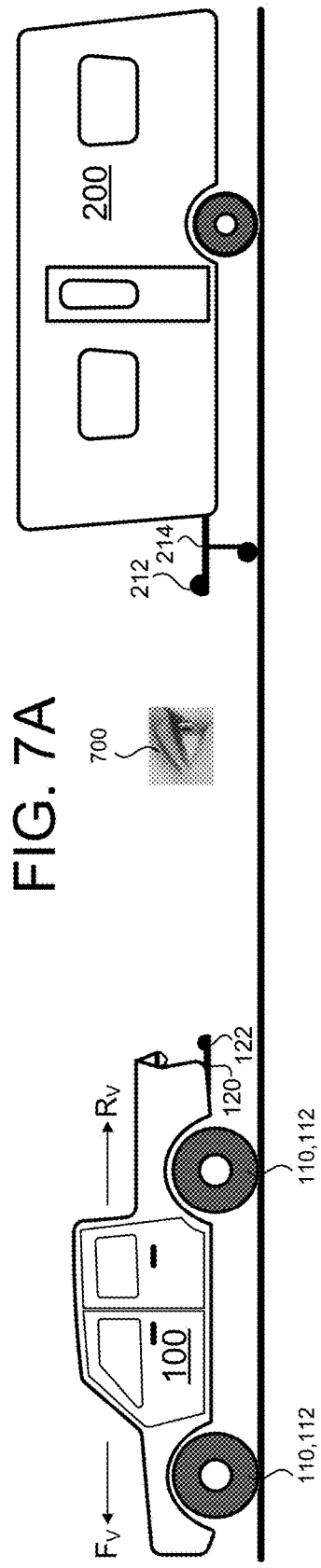
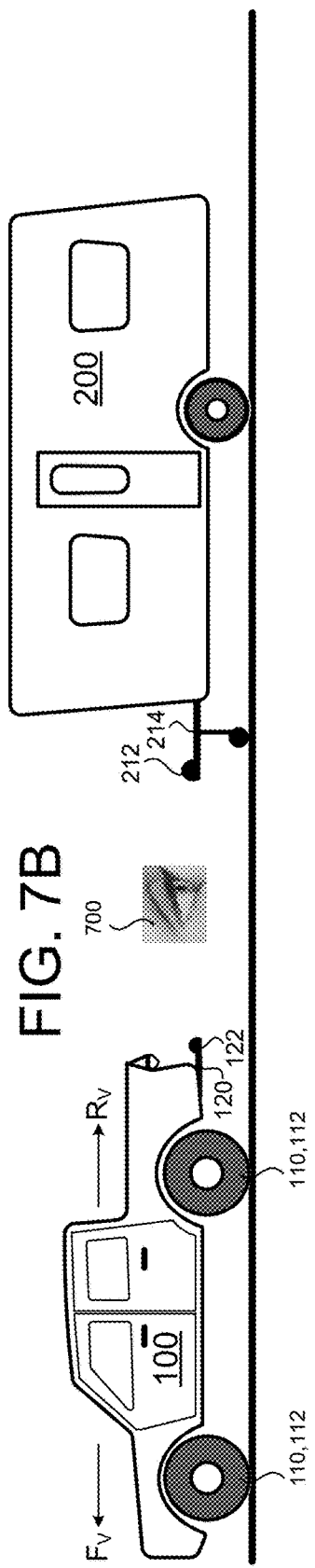
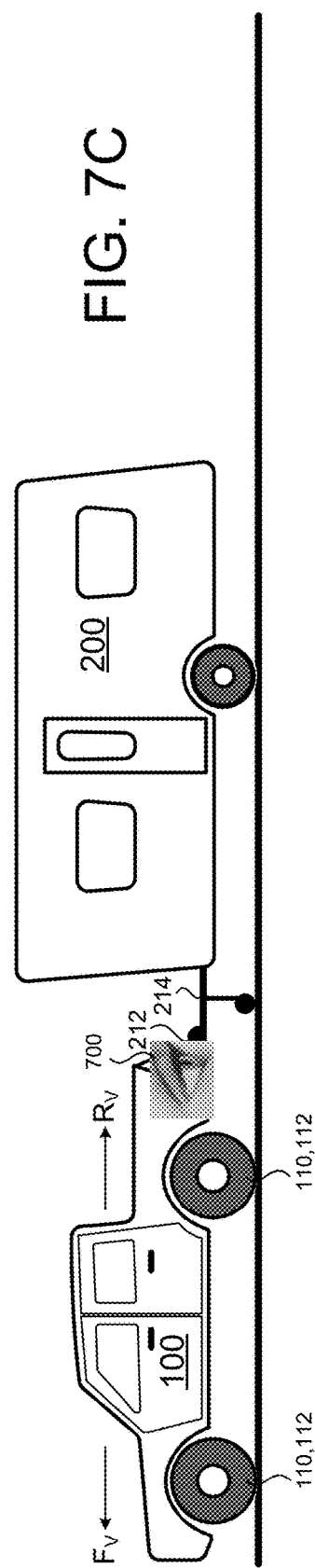

DEVICE AND METHOD FOR DETERMINING A CENTER OF A TRAILER TOW COUPLER

CROSS REFERENCE TO RELATED APPLICATIONS

This U.S. patent application claims priority under 35 U.S.C. § 119(e) to U.S. Provisional Application 62/663,354, filed on Apr. 27, 2018, which is hereby incorporated by reference in its entirety.

TECHNICAL FIELD

This disclosure relates to a device and method for determining a center of a trailer tow coupler.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection.

In some examples, the trailer includes a coupler tongue (i.e., the trailer hitch), a tow-bar connecting the coupler tongue to the trailer, a jack support for supporting the trailer before connection to the vehicle that pivots about a wheel axle center of the trailer wheels. Trailer connections and features vary greatly. For example, trailer-tow-bar-coupler features include different shapes, colors, tow-bar types, coupler types, jack support types, tongue attachment to a frame of the trailer, location of the jack support, extra objects the trailer supports, size and weight capacity of the trailer, and number of axles. Therefore, the different combinations of the above features results in many different trailer models, making the trailer types very diverse. In addition, in some examples, a trailer owner personalizes his/her trailer, which further makes the trailer more different. Therefore, a vehicle having a trailer detection system configured to identify a trailer positioned behind the vehicle, may have difficulty identifying a trailer or a trailer hitch due to the different trailer types available. Moreover, the vehicle identification system may have a hard time identifying a trailer positioned in the back of the vehicle because the trailer may be positioned on a variety of surfaces such as grass, dirt road, beach, etc. other than well maintained road that make it difficult to identify. In current trailer identification systems, if the identification system has not previously stored such an environment, then the identification system is not able to identify the trailer. In addition, current trailer identification system that use a vision-based approach to detect the trailer tends to generalize the features of the trailer features, i.e., the tow-bar, the coupler, which results in a failure to detect a trailer having non-common features, or a customized trailer, or personalized trailer in an uncommon environment (i.e., an environment different from a well maintained road). In addition, the production of the trailer identification system hardware to detect the different trailer is very costly due to the large amount of data processing needed. Therefore, the current trailer detection systems are not able to distinguish a specific trailer combination in multiple trailer scenarios.

It is desirable to have a system that tackles the aforementioned problems by quickly and easily identify a trailer-tow-bar-coupler combination regardless of the shape and surface the trailer is positioned on.

SUMMARY

One aspect of the disclosure provides a method for determining a location of a target positioned behind a tow vehicle. The method includes receiving, at data processing hardware, images from a camera positioned on a back portion of the tow vehicle and in communication with the data processing hardware. The images include the target. The method also includes applying, by the data processing hardware, one or more filter banks to the images. The method includes determining, by the data processing hardware, a region of interest within each image based on the applied filter banks. The region of interest includes the target. The method also includes identifying, by the data processing hardware, the target within the region of interest. The method also includes determining, by the data processing hardware, a target location of the target including a location in a real-world coordinate system. The method also includes transmitting, from the data processing hardware, instructions to a drive system supported by the vehicle and in communication with the data processing hardware. The instructions cause the tow vehicle to autonomously maneuver towards the location in the real-world coordinate system.

Implementations of the disclosure may include one or more of the following optional features. In some implementations, the method further includes tracking, by the data processing hardware, the target while the tow vehicle autonomously maneuvers towards the identified target. The method may also include determining, by the data processing hardware, an updated target location. In some examples, the method includes transmitting, from the data processing hardware, updated instructions to the drive system. The updated instructions cause the tow vehicle to autonomously maneuver towards the updated target location.

In some implementations, the camera includes a fisheye camera capturing fisheye images. In some examples, the method further includes rectifying, by the data processing hardware, the fisheye images before applying the one or more filter banks.

In some implementations, the method includes receiving, at the data processing hardware, training images stored in hardware memory in communication with the data processing hardware and determining, by the data processing hardware, a training region of interest within each received image. The training region of interest includes a target. The method may include determining, by the data processing hardware, the one or more filter banks within each training region of interest. In some examples, the method further includes: identifying, by the data processing hardware, a center of the target, where the target location includes a location of the center of the target.

The target may be a coupler of a tow-bar-coupler supported by a trailer. The images may be a top-down view of the tow-bar-coupler. In some examples, the target is a trailer positioned behind the tow vehicle and the target location is a location of a trailer bottom center at a tow-bar. The images are a perspective view of the trailer.

Another aspect of the disclosure provides a system for determining a location of a target positioned behind a tow vehicle. The system includes: data processing hardware and memory hardware in communication with the data processing hardware. The memory hardware stores instructions that when executed on the data processing hardware cause the data processing hardware to perform operations. The operations include receiving images from a camera positioned on a back portion of the tow vehicle and in communication with the data processing hardware. The images include the target. The operations include applying one or more filter banks to the images. The operations include determining a region of interest within each image based on the applied filter banks. The region of interest includes the target. The operations include identifying the target within the region of interest and determining a target location of the target including a location in a real-world coordinate system. The operations include transmitting instructions to a drive system supported by the vehicle and in communication with the data processing hardware. The instructions causing the tow vehicle to autonomously maneuver towards the location in the real-world coordinate system.

Implementations of this aspect of the disclosure may include one or more of the following optional features. In some implementations, the operations further include tracking the target while the tow vehicle autonomously maneuvers towards the identified target. The operations may include determining an updated target location and transmitting updated instructions to the drive system. The updated instructions causing the tow vehicle to autonomously maneuver towards the updated target location.

In some implementations, the camera includes a fisheye camera capturing fisheye images. The operations may include rectifying the fisheye images before applying the one or more filter banks.

In some examples, the operations further include: receiving training images stored in hardware memory in communication with the data processing hardware; and determining a training region of interest within each received image. The training region of interest includes a target. The operations may also include determining the one or more filter banks within each training region of interest. The operations further include identifying a center of the target, where the target location includes a location of the center of the target.

In some examples, the target is a coupler of a tow-bar-coupler supported by a trailer. The images may be a top-down view of the tow-bar-coupler. The target may be a trailer positioned behind the tow vehicle and the target location is a location of a trailer bottom center at a tow-bar. The images are a perspective view of the trailer.

The details of one or more implementations of the disclosure are set forth in the accompanying drawings and the description below. Other aspects, features, and advantages will be apparent from the description and drawings, and from the claims.

DESCRIPTION OF THE DRAWINGS

FIGS. 7A-7C are schematic side views of a trailer positioned behind the vehicle at different distances therebetween.

Like reference symbols in the various drawings indicate like elements.

DETAILED DESCRIPTION

Figure 1:
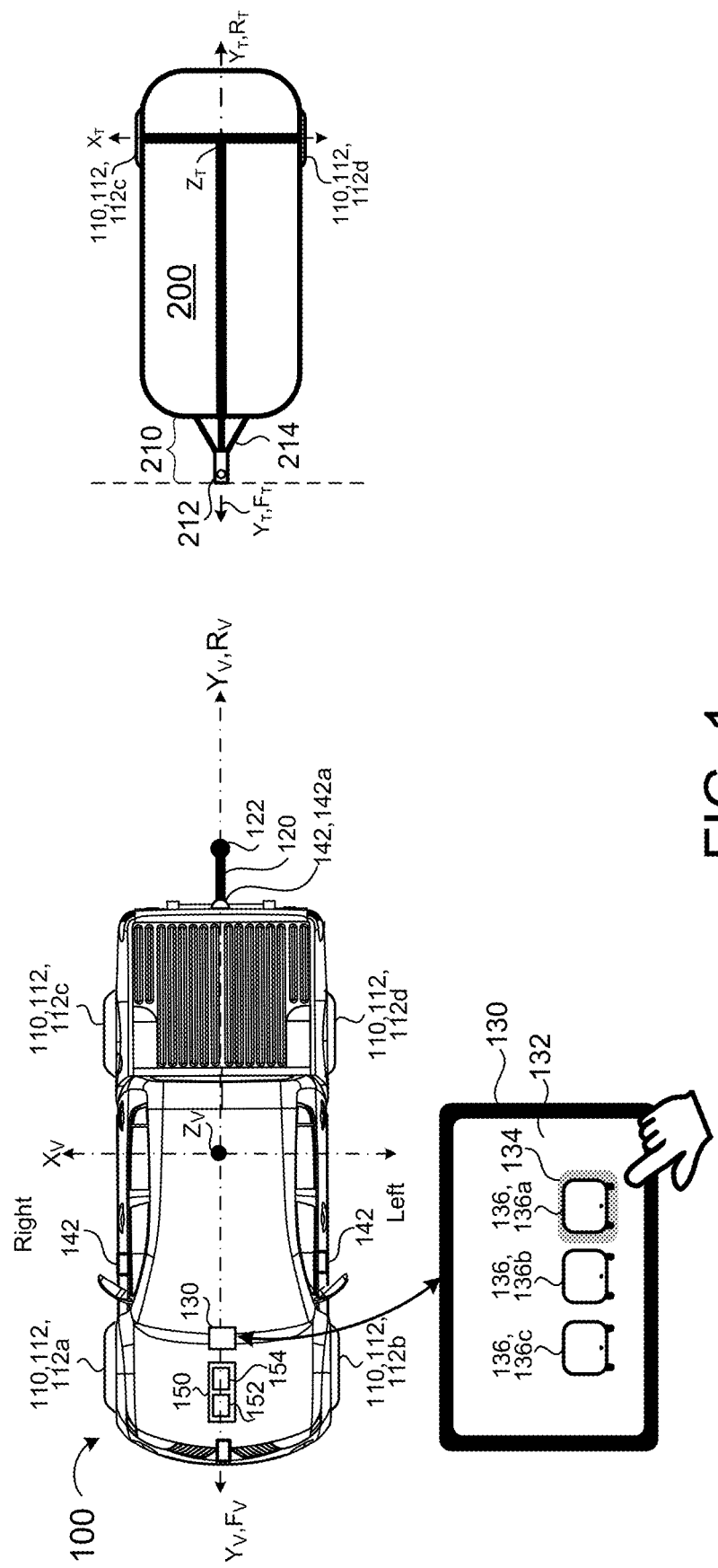
FIG. 1 is a schematic top view of an exemplary tow vehicle at a distance from a trailer.
Figure 2:
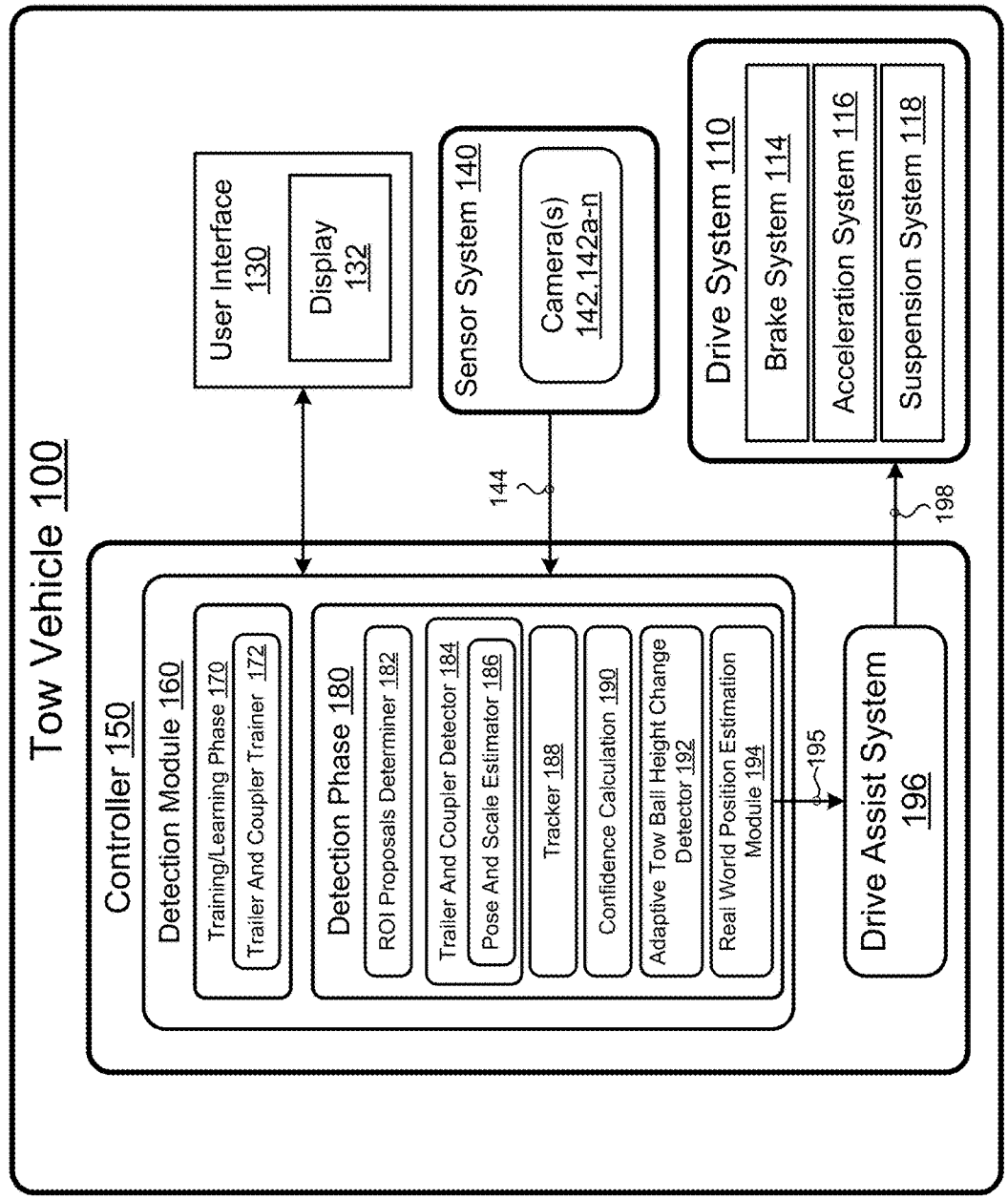
FIG. 2 is a schematic view of an exemplary vehicle.

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a trailer hitch ball supported by the vehicle and a trailer hitch coupler. It is desirable to have a tow vehicle that is capable of detecting a tow-bar of the trailer and then detecting and localizing a center of the trailer hitch coupler positioned on the tow-bar of the trailer. In addition, it is desirable for the tow vehicle to detect the tow-bar and detect and localize the center of the trailer coupler while the vehicle is moving in a reverse direction towards the trailer. As such, a tow vehicle with a detection module provides a driver and/or vehicle with information that aids in driving (driver or autonomously) the tow vehicle towards to the trailer in the reverse direction. The detection module is configured to learn how to detect a trailer having a tow-bar and a coupler of trailer and based on the learned data, the detection module may receive an image from a camera, such as a fisheye camera, having high distortion rate and determine the location of the tow-bar and the center of the coupler while the tow vehicle approaches the trailer. In addition, a tow vehicle that includes a detection module easily identifies the trailer-tow-bar-coupler combination regardless of the shape and surface the trailer is positioned on. During a learning phase, the detection module learns to detect any shape tow-bar and any shape coupler, which during a detection phase, the detection module can use the learned data to accurately localize a center of the coupler and/or key point(s) of the trailer. In some examples, the learning phase and the detection phase include the use of a cascade approach on rigidly connected components (e.g., Trailer body such as Box, V-Nose, Boat etc., trailer frame with two or more wheels for trailer body to be bolted on and coupler tongue sometimes is a part of the frame, sometimes is a separate components belong bolted on the tow-bar) of the trailer-tow-bar-coupler combination so that a coupler center localization confidence may be improved through the relationships between these components. For example, the cascade approach implements an algorithm that detects a trailer body first, then detects the tow-bar-coupler combination, then zoom in to take a close look at the coupler center and its surrounding features, and finally detects the couple tongue. The zoom ratio may be anywhere 1.5-2.5 as long as there are sufficient features that may be used to identify the coupler center $L_{CCP}$. The detection module is also capable of differentiating between multiple classes of trailer-tow-bar-coupler combinations parked side by side in one scene, such as in a trailer park.

Referring to FIGS. 1A-4, in some implementations, a driver of a tow vehicle 100 wants to tow a trailer 200 positioned behind the tow vehicle 100. The tow vehicle 100 may be configured to receive an indication of a driver selection associated with a selected trailer 200. In some examples, the driver maneuvers the tow vehicle 100 towards the selected trailer 200; while in other examples, the tow vehicle 100 autonomously drives towards the selected trailer 200. The tow vehicle 100 may include a drive system 110 that maneuvers the tow vehicle 100 across a road surface based on drive commands having x, y, and z components, for example. As shown, the drive system 110 includes a front right wheel 112, 112a, a front left wheel 112, 112b, a rear right wheel 112, 112c, and a rear left wheel 112, 112d. The drive system 110 may include other wheel configurations as well. The drive system 110 may also include a brake system 114 that includes brakes associated with each wheel 112, 112a-d, and an acceleration system 116 that is configured to adjust a speed and direction of the tow vehicle 100. In addition, the drive system 110 may include a suspension system 118 that includes tires associates with each wheel 112, 112a-d, tire air, springs, shock absorbers, and linkages that connect the tow vehicle 100 to its wheels 112, 112a-d and allows relative motion between the tow vehicle 100 and the wheels 112, 112a-d. The suspension system 118 may be configured to adjust a height of the tow vehicle 100 allowing a tow vehicle hitch 120 (e.g., a tow vehicle hitch ball 122) to align with a trailer hitch 210 (e.g., coupler-tow-bar combination 210) supported by a trailer tow-bar 214, which allows for connection between the tow vehicle 100 and the trailer 200.

The tow vehicle 100 may move across the road surface by various combinations of movements relative to three mutually perpendicular axes defined by the tow vehicle 100: a transverse axis $X_v$, a fore-aft axis $Y_v$, and a central vertical axis $Z_v$. The transverse axis x extends between a right side and a left side of the tow vehicle 100. A forward drive direction along the fore-aft axis $Y_v$ is designated as $F_v$, also referred to as a forward motion. In addition, an aft or reverse drive direction along the fore-aft direction $Y_v$ is designated as $R_v$, also referred to as rearward or reverse motion. When the suspension system 118 adjusts the suspension of the tow vehicle 100, the tow vehicle 100 may tilt about the $X_v$ axis and or $Y_v$ axis, or move along the central vertical axis $Z_v$.

The tow vehicle 100 may include a user interface 130, such as, a display. The user interface 130 receives one or more user commands from the driver via one or more input mechanisms or a touch screen display 132 and/or displays one or more notifications to the driver. The user interface 130 is in communication with a vehicle controller 150, which in turn is in communication with a sensor system 140. In some examples, the user interface 130 displays an image of an environment of the tow vehicle 100 leading to one or more commands being received by the user interface 130 (from the driver) that initiate execution of one or more behaviors. In some examples, the user display 132 displays one or more representations 136 of trailers 200 positioned behind the tow vehicle 100. In this case, the driver selects 134 which representation 136 of a trailer 200 the controller 150 should identify, detect, and localize the center of the coupler 212 associated with the selected trailer 200. In other examples, the controller 150 detects one or more trailers 200 and detect and localize the center of the trailer coupler 212 of the one or more trailers. The vehicle controller 150 includes a computing device (or processor) 152 (e.g., central processing unit having one or more computing processors) in communication with non-transitory memory 154 (e.g., a hard disk, flash memory, random-access memory, memory hardware) capable of storing instructions executable on the computing processor(s) 152.

The tow vehicle 100 may include a sensor system 140 to provide reliable and robust driving. The sensor system 140 may include different types of sensors that may be used separately or with one another to create a perception of the environment of the tow vehicle 100 that is used for the tow vehicle 100 to drive and aid the driver in make intelligent decisions based on objects and obstacles detected by the sensor system 140 or aids the drive system 110 in autonomously maneuvering the tow vehicle 100. The sensor system 140 may include, but is not limited to, radar, sonar, LIDAR (Light Detection and Ranging, which can entail optical remote sensing that measures properties of scattered light to find range and/or other information of a distant target), LADAR (Laser Detection and Ranging), ultrasonic sensor(s), etc.

In some implementations, the sensor system 140 includes one or more cameras 142, 142a-n supported by the vehicle. In some examples, the sensor system 140 includes a rear-view camera 142a mounted to provide a view of a rear-driving path of the tow vehicle 100. The rear-view camera 410 may include a fisheye lens that includes an ultra wide-angle lens that produces strong visual distortion intended to create a wide panoramic or hemispherical image. Fisheye cameras 142a capture images having an extremely wide angle of view. Moreover, images captured by the fisheye camera 142a have a characteristic convex non-rectilinear appearance.

Detection Module 160

The vehicle controller 150 includes a detection module 160 that receives images 144 from the rear camera 410a (i.e., fisheye images) and determines the location of the tow-bar 214 and the location of the coupler 212, for example, a center of the coupler 212 within the image(s) 144 and in a world coordinate. In some examples, the detection module 160 determines the tow-bar 214 and the center of the coupler 212 at a far range, mid-range, and near range distance between the tow vehicle 100 and the trailer 200. In some implementations, the detection module 310 includes a training/learning phase 170 followed by a detection phase 180. During the training/learning phase 170, the detection module 160 executes a trailer and coupler training module 172. In addition, during the detection phase 180, the detection module 160 executes the following: ROI proposals determiner 182, trailer and coupler detector 184, pose and scale estimator 186, a Kalman multi-channel correlation filter (MCCF) tracker 188, a confidence calculation module 190, an adaptive tow ball height change detector 192, and a real-world position estimation module 194.

Training/Learning Phase 170

Figure 3:
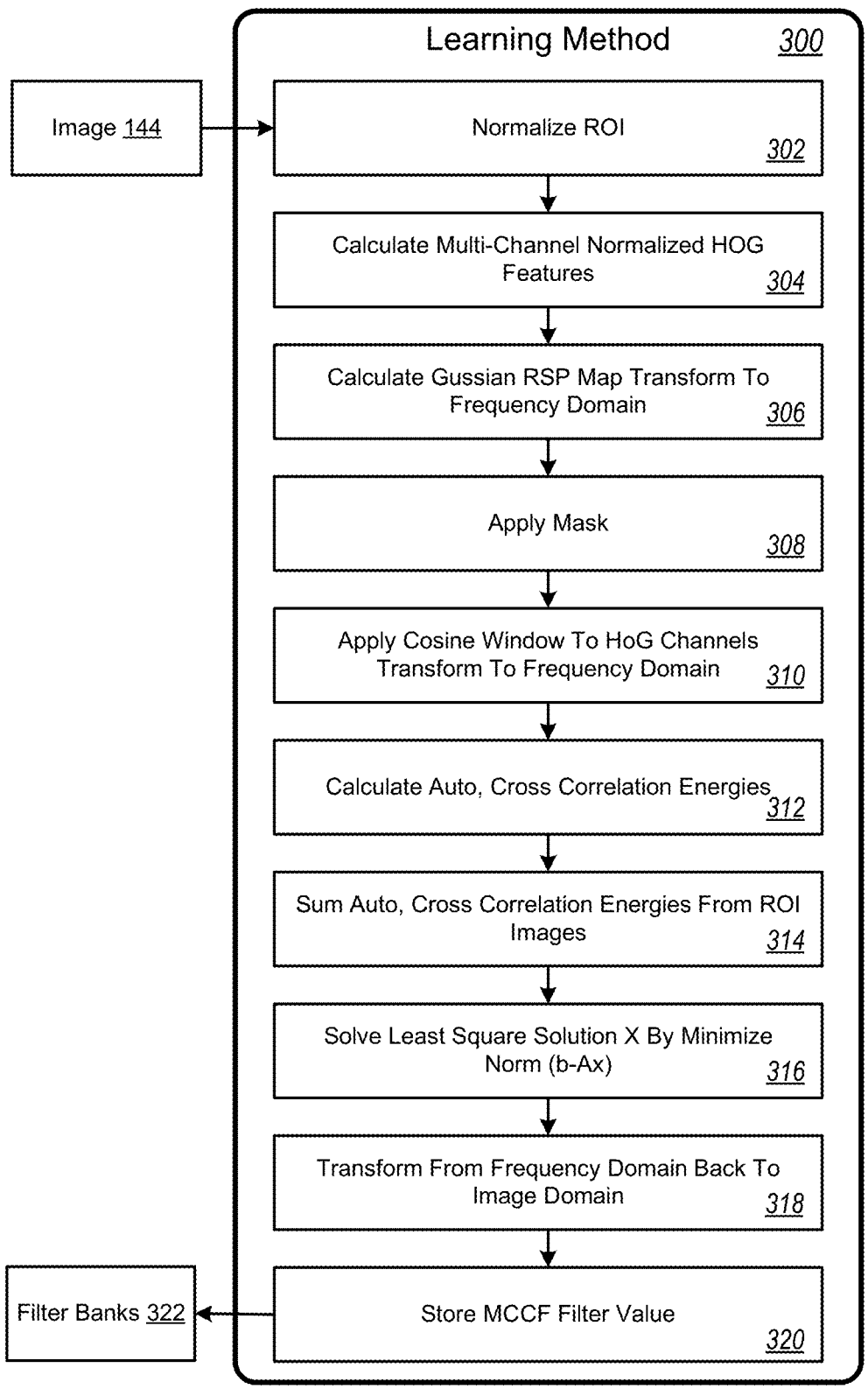
FIG. 3 is a schematic view of an exemplary arrangement of operations executed during a training phase.
Figure 4A:
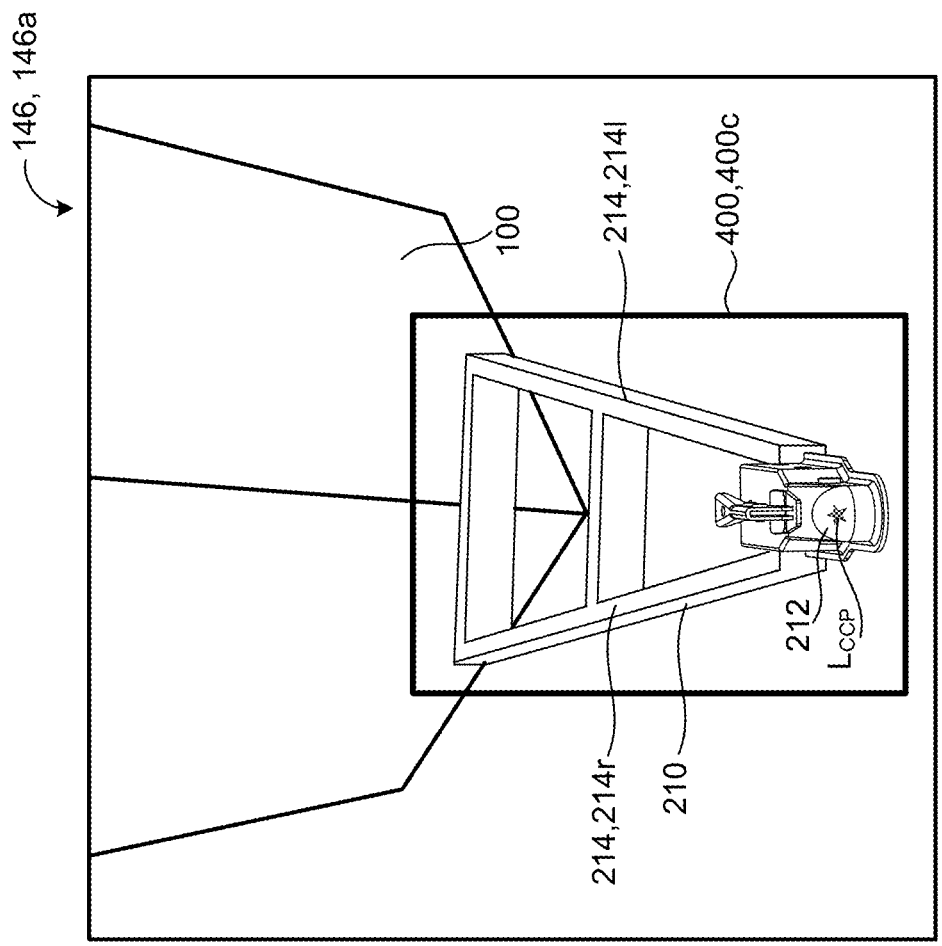
FIG. 4A is a schematic view of an exemplary image that includes the tow-bar and coupler.
Figure 4C:
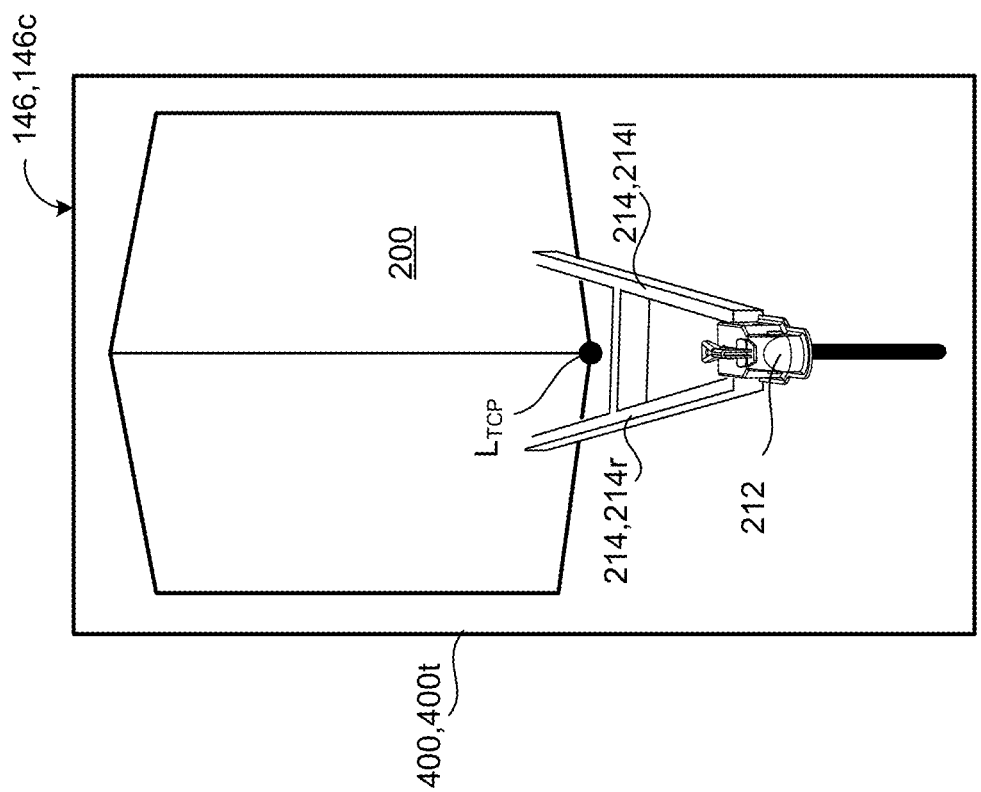
FIGS. 4B and 4C schematic view of an exemplary image that includes the trailer at different distances from the tow vehicle.
Figure 4B:
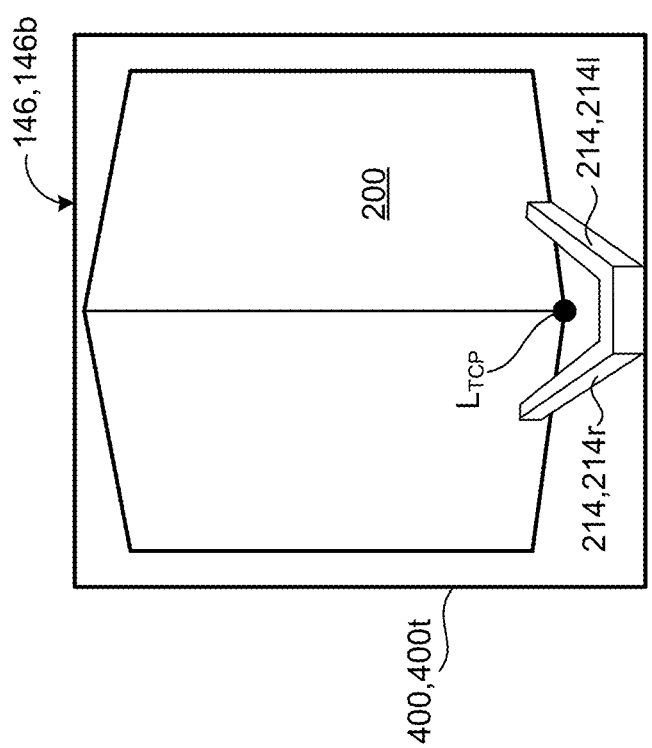

FIGS. 3 and 4A-4C illustrate the training/learning phase 170. Referring to FIG. 3, The detection module 310 executes a trailer and coupler trainer module 172 for teaching the Kalman MCCF tracker 188 how to detect the coupler 212 and the tow-bar 214. Referring to FIG. 3, the trainer module 172 receives an input image 144 captured by the rear camera 410a, i.e., a fisheye camera. The input image 144 includes a region of interest (ROI) 400 of either the trailer 200 or the coupler-tow-bar combination 210 (including the coupler 212 and the tow-bar 214). Referring to FIG. 4A, the input image 144 includes a pixel location $L_{CCP}$ of the center of the coupler 212 within the image 144 and the coupler-tow-bar combination 210 since in this case the trailer and coupler trainer module 172 is learning how to detect the coupler 212 within the coupler-tow-bar combination 210 ROI 400c. While FIGS. 4B and 4C show the trailer 200. The pixel location of the center $L_{CCP}$ of the coupler 212 (FIG. 4A) or the pixel location $L_{TCP}$ of the trailer bottom center at the tow-bar 214 in the training image 144 are pre-determined before the training/learning phase 170, for example, pixel (64, 42) in a (100×100 pixels) training image 144. In some examples, the ROI 400, 400c, 400t is rescaled to a fixed pixel size, for example (100×100 pixels) for the training and learning phase 170. The trainer module 172, for a particular range of pixels, maintains that the center $L_{CCP}$ of the coupler 212 or the bottom center $L_{TCP}$ of the trailer at the tow-bar 214 in the training image 144 is kept at the same location within the image 144.

FIG. 4A illustrates a top-down rectified image 146 based on images 144 captured by the rearview camera 142a. The controller 150 adjusts the received images 144 to remove distortion caused by the rear camera 142a being a fisheye camera. Since the camera 142a is position above the coupler-tow-bar combination 210 with respect to the road surface, the images 144 captured by the camera 142a of the coupler-tow-bar combination 210 are generally a top-down view of the coupler-tow-bar combination 210. In addition, the trainer module 172 determines a region of interest (ROI) 400, 400c within the rectified image 146 that includes the coupler-tow-bar combination 210.

FIGS. 4B and 4C are perspective views at different distances of a rectified image 146 that includes the trailer 200. FIG. 4B is of a rectified image 146b associated with an image 144 captured at a first distance from the trailer 200, while FIG. 4C is of a rectified 146c associated with another image 144 captured at a second distance from the trailer 200, where the second distance is greater than the first distance. Since the trailer 200 is positioned behind the tow vehicle 100, then the camera 142a may capture a straight-ahead image 144 of the trailer 200. Therefore, the rectified images 146b, 146c that are based on the straight-ahead images 144, are also straight-ahead views. In some examples, the trainer module 172 determines the trailer ROI 400t within the rectified image 146b, 146c that include the trailer 200. As shown, the rectified images 146b, 146c are also the ROI 400t identified by the trainer module 172.

As mentioned above, the trainer module 172 rectifies the captured images 144. In some examples, in the top down view shown in FIG. 4A of the coupler-tow-bar combination 210, the appearance of the tow-bar-coupler (i.e., the aspect ratio of the shape) of the coupler-tow-bar combination 210 does not change. The scale change of the top down coupler-tow-bar combination 210 is indicative of the change of height of the coupler-tow-bar combination 210. In the rear perspective view shown in FIGS. 4B and 4C, the appearance of the trailer 200 does not change given a fixed pitch angle; however, the appearance of the trailer 200 changes if the pitch angle changes. In some examples, the appearance changes described above due to the trailer pitch angle change may be used to estimate trailer pitch angle given a reference image path with a fixed pitch angle. The image path being around the trailer.

Additionally, the appearance changes described above may be used to estimate trailer yaw angle (i.e., orientation) given a reference patch with a fixed yaw angle. The correlation energy reaches maximum when the test image matched the trained image. Referring back to FIG. 3, at step 302, the trainer module 172 executes a normalizing function on the ROI 400, 400c, 400t to reduce the lighting variations. Then, at step 304 the trainer module 172 executes a gradient function, for example, by determining image pixel value difference in both x and y direction within the ROI 400, 400c, 400t. The trainer module 172 determines a magnitude and an orientation from the following formulas:

$$\text{Magnitude: } (\text{sqrt}(Gx^2+Gy^2));\tag{1}$$

$$\text{Orientation: } (\arctan 2(Gy/Gx)).\tag{2}$$

The trainer module 172 may determine formulas (1) and (2) from the gradient in the x direction (Gx) and the gradient in the y direction (Gy) to determine the directional change in the intensity or color in the received image ROI 400, 400c, 400t and determine a histogram of the gradients.

The histogram of gradients (HOG) is a feature descriptor used in computer vision and image processing to characterize one or more objects within an image. The HOG determines a number of bins (for example, 5 bins) of gradient orientation in localized portions of the image. Each bin represents a certain orientation range.

At step 304, based on the HOG, the trainer module 172 determines a number of bins associated with the HOG. The trainer module 172 executes a cell-wise normalizing function and a block-wise normalization function. During the cell-wise normalization function, the average of the gradient magnitude and the gradient orientation over each cell is determined, a cell size for example is (5×5 pixels). The trainer module 172 determines the number of cells, for example (20×20 pixels), based on the size of the ROI 400, 400c, 400t, (for example 100×100 pixels) divided by a cell size (for example (5×5). If the trainer module 172 determines that an average gradient magnitude in a specific cell is below zero, then the trainer module 172 set the value of the cell to 0. If the trainer module 172 determines that the average gradient orientation in a specific cell is below zero, then the trainer module 172 sets the value of the cell to 0. The trainer module 172 determines the average gradient orientation bins based on the average gradient orientations, then multiples the average gradient orientation bins by an inversion of the average gradient magnitude plus 0.1. During the block-wise normalization function, all cell-wise normalized gradient orientation channels are squared and added up and averaged over cell size (for example, (5×5)) by the trainer module 172. The trainer module 172 sets a sum of gradient square bins (GSsum) to zero when GSsum is less than zero. The trainer module 172 obtains the final sum of gradient (Gsum) by square rooting the GSsum. The trainer module 172 normalizes the final HOG bins by Gsum, where the cell-normalized gradient bins are again divided by Gsum plus 0.1. The steps of block 304 accommodate for the lighting and environmental variations.

At step 306, the trainer module 172 applies a Gaussian filter around a target location being the center $L_{CCP}$ of the coupler (as 'pos' in the following equation) or the pixel location $L_{TCP}$ of the trailer bottom center at the tow-bar 214:

$$rsp(i,j)=\exp(-((i-pos(1))^2+(j-pos(2))^2)/(2*S^2)).\tag{3}$$

S is sigma, a tunable parameter. Since this is a learning step, the trainer module 172 knows the position of the coupler 212 within the image, and therefore, applies the Gaussian filter around the known position. The Gaussian response, the size of the image patch as 'rsp' is also transformed into frequency domain for fast computation time to obtain Gaussian response in frequency domain as 'rsp_f' (being the size of the image 144 in frequency domain).

At step 308, the trainer module 172 applies a mask to the ROI 400, 400c, 400t which improves the performance. The trainer module 172 applies the mask to mask out a region surrounding the trailer 200 or coupler-tow-bar combination 210. At step 310, the trainer module 172 applies a cosine window function on the cell/block normalized HoG channels to reduce the high frequencies of image borders of the rectified image 146 (i.e., ROI 400) and transforms the HoG channels into frequency domain for fast computation time to obtain the HoG_f (HOG frequency). At step 312, the trainer module 172 calculates Auto- and Cross-correlation energies, xxF and xyF respectively. Auto-correlation energy xxF is obtained by HoG_f multiplied by the transpose of HoG_f. Cross-correlation energy xyF is obtained by rsp_f multiplied by the transpose of HoG_f. At step 314, the trainer module 172 sums up the Auto-correlation energy xxF and Cross-correlation energy xyF across multiple ROIs 400 in the same range separately. At step 316, the trainer module 172 solves equation:

$$MCCF = lsqr(xxF + \text{lambda}, xyF) \qquad (4)$$

Equation (4) solves for filter banks 322 (i.e., MCCF) and transforms from frequency domain back to image domain, at step 318. The filter banks 322 are multi-channel correlation filter banks 322 that provide characteristics of the trailer or the coupler-tow-bar combination 210 (ie., the trailer hitch 201). As such, the filter banks 322 are later used to determine the location of a trailer 200 or a coupler 212 within a captured image 144 during a detection phase 180, where the position of the trailer 200 or the coupler 212 is not known within the image 144. At step 320, the trainer module 172 stores the filter banks 322 (i.e., MCCF) associated with the trailer 200 and the coupler-tow-bar combination 210 determined by equation (4) in memory hardware 154.

In some implementations, the trainer module 172 separately determines three filter banks 322 by executing the steps in FIG. 3 on images 144 captured within a far-range, a mid-range and a near-range to accommodate the appearance, resolution and scale changes of the trailer 200, coupler-tow-bar combination 210 within each image 144.

In some implementations, the training/training and learning phase 170 may be executed on a raw fisheye image 144 in a supervised manner, such as, for example, along the vehicle center line Y with a zero-orientation angle at a specific distance from the trailer 200 in a dynamic driving scenario. In some examples, the training/training and learning phase 170 may be further simplified by using a single image frame or a few image frames. In some examples, the captured fisheye image 144 is rectified as explained in FIGS. 4A-4C. The trainer 172 uses the top down view for the filter learning associated with the coupler-tow-bar combination 210, while the trailer 172 uses the forward perspective view for the filter learning of the trailer 200. In some examples, the learning images 144 are stored in memory 154. The learning images 144 may include the trailer 200 and tow vehicle in a hitched position where a location of the truck tow ball 122 is known. The filter banks 322, whic are learned during the training and learning phase 170 based on the rectified images 146, may be applied to rectified images 146 for determining a center location $L_{CCP}$ of the trailer 200 and the pixel location $L_{TCP}$ of the trailer bottom center at the tow-bar 214 during real-time operation. In some examples, the center location $L_{CCP}$ of the trailer 200 is determined by capturing an image 144 in a forward perspective view (FIGS. 4B and 4C). The coupler center may be determined by capturing an image 144 in a top down view in near range (FIG. 4A). In some implementations, the training and learning phase 170 may also include images of the trailer 200 and the tow vehicle 100 in an un-hitched position. In some examples, the images 144 of the trailer 200 may be captured at three to four meters away from the tow vehicle 100. The image 144 may include a side of the trailer 200 facing the tow vehicle 100.

In some examples, during the training and learning phase 170, the trailer 200 and coupler-tow-bar combination 210 in the rectified images 146 are not in random orientation and have a known orientation angle, such as, for example 0° or 90°. Additionally, the trailer 200 and the coupler-tow-bar combination 210 are orthogonally connected to one another within the images 144 of captured of the forward perspective view (FIGS. 4B and 4C) and the top down view (FIG. 4A) similar to their connection in real life.

In some implementation, the trainer module 172 rectifies the captured top view image 146a of the tow-bar-coupler ROI 400c such that the tow-bar-coupler ROI 400c is at a zero orientation with respect to the tow vehicle 100, i.e., the longitudinal axis Y of the tow vehicle 100 while the tow vehicle 100 is hitched to the trailer 200. In addition, the trainer rectifies the perspective image 146b, 146c of the trailer 200 such that the trailer ROI 400b is at a zero orientation with respect to the tow vehicle 100, i.e., the longitudinal axis Y of the tow vehicle 100 while the tow vehicle 100 is hitched to the trailer 200.

In some examples, the filter banks 322 that are learned during the learning process 170 are used to estimate a trailer pitch of the trailer 200. The trainer module 172 may mask out regions within the images 144 that are not the coupler-tow-bar combination 210 or the trailer 200. Therefore, the trainer module 172 only uses the coupler-tow-bar combination 210 or the trailer 200 regions within an ROI 400 of an image 144 and the surrounding regions are masked during training so that the trained ROI 400 may be used in different environmental conditions with consistent results. This approach decreases the amount of training data stored in memory 154.

In some implementations, the trainer module 172 analyzes additional image key points other than the center $L_{CCP}$ of the coupler 212 or the bottom center $L_{TCP}$ of the trailer at the tow-bar 214. Therefore, during the detection phase 180, the controller 150 can use correlation energies from the additional key points during real-time operation to determine a confidence value. Therefore, key points within the training ROI 400 may be matched with key point identified in images captured in real time to increase the confidence of the detection phase 180.

In some implementations, the trainer module 172 may generate a three-dimensional (3D) view of the trailer 200, the tow-bar 214 and the coupler 212 during the training and learning phase 170. Additionally, the trainer module 172 may generate the 3D view in a measuring scale, thus the trainer module 172 can determine a scale between physical trailer components and the normalized ROI 400. In some examples, the trainer module 172 determines and learns shape characteristics of the trailer 200 and coupler-tow-bar combination 210.

In some examples, the trainer module 172 is executed upon a driver of the tow vehicle 100 first using the tow vehicle 100. Therefore, the trainer module 172 determines the filter banks 322 based on one or more images 144 received during the driver's first use of the tow vehicle. In some examples, the filter banks 322 can also be used in an online adaptive learning process or the tow vehicle 100 may receive additional filter banks 322 from an online system.

In some examples, the training and learning phase 170 is executed on a cloud computing hardware device located separately from the tow vehicle 100. For example, the rear camera 142a of the tow vehicle 100 captures images 144 of a rear environment of the vehicle and transmits, via a wireless internet connection, the captured images 144 to the cloud computing hardware device. The cloud computing hardware device executes the trainer module 172 and once the filter banks 322 are determined, the cloud computing hardware device transmits the filters banks 322 back to the tow vehicle 100 by way of the wireless internet connection. The tow vehicle 100 receives the filter banks 322 and stores the filter banks 322 in memory hardware 154.

Detection Phase 180

Once the training and learning phase 170 is executed and completed, the detection phase 180 can be executed. The detection module 160 executes the following: ROI proposals determiner 182, trailer and coupler detector 184, pose and scale estimator 186, a Kalman multi-channel correlation filter (MCCF) tracker 188, a confidence calculation module 190, an adaptive tow ball height change detector 192, and a real-world position estimation module 194. The ROI proposals determiner 182, which may be optionally implements, analyzes the captured images 144 and outputs an ROI proposal 400p that includes the coupler-tow-bar combination 210 or the trailer 200. Then the trailer and coupler detector 184 analyzes the ROI proposals 400p and uses the ROIs 400c, 400t from FIG. 4A-4C to locate the trailer (if far) and tow-bar-coupler if close. The pose and scale estimator 186 analyzes the image as a whole and determines a pose of the trailer 200. Following the Kalman MCCF tracker 188 follows the located trailer or tow-bar coupler (located by the trailer and coupler detector 184) while the tow vehicle 100 is moving towards the trailer 200. The confidence calculator 190 calculates a confidence to determine the position of the coupler. In some examples, the adaptive vehicle tow ball height change detector 192 checks the vehicle tow ball height changes based on the position of the current trailer hitch 210. The adaptive vehicle tow ball height change detector 192 may be executed while the trailer 200 and the tow vehicle 100 are in the hitched position, thus, the adaptive vehicle tow ball height change detector checks the tow-ball height change and verifies that the trained/learned information which is stored in memory hardware 152 matched the features learned from the current tow-ball height so that potential collision may be avoided in the next hitching attempt. Finally, the real-world position estimation module 194 determines the position of the coupler 212 based on the above modules 182-192 in real world coordinates.

ROI Proposal Determiner 182

Figure 5:
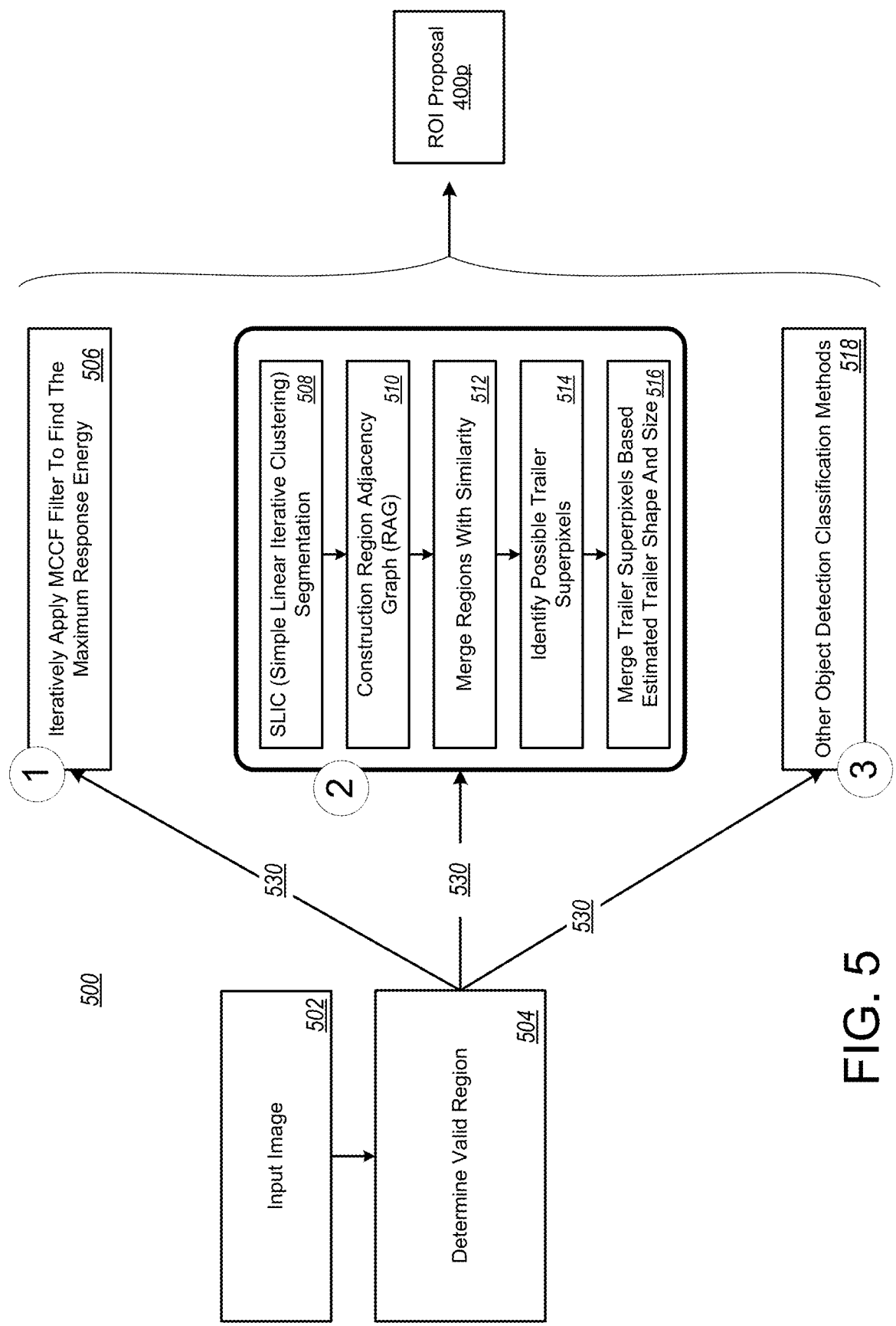
FIG. 5 is schematic view of an exemplary arrangement of operations for determining a region of interest proposal.
Figure 5A:
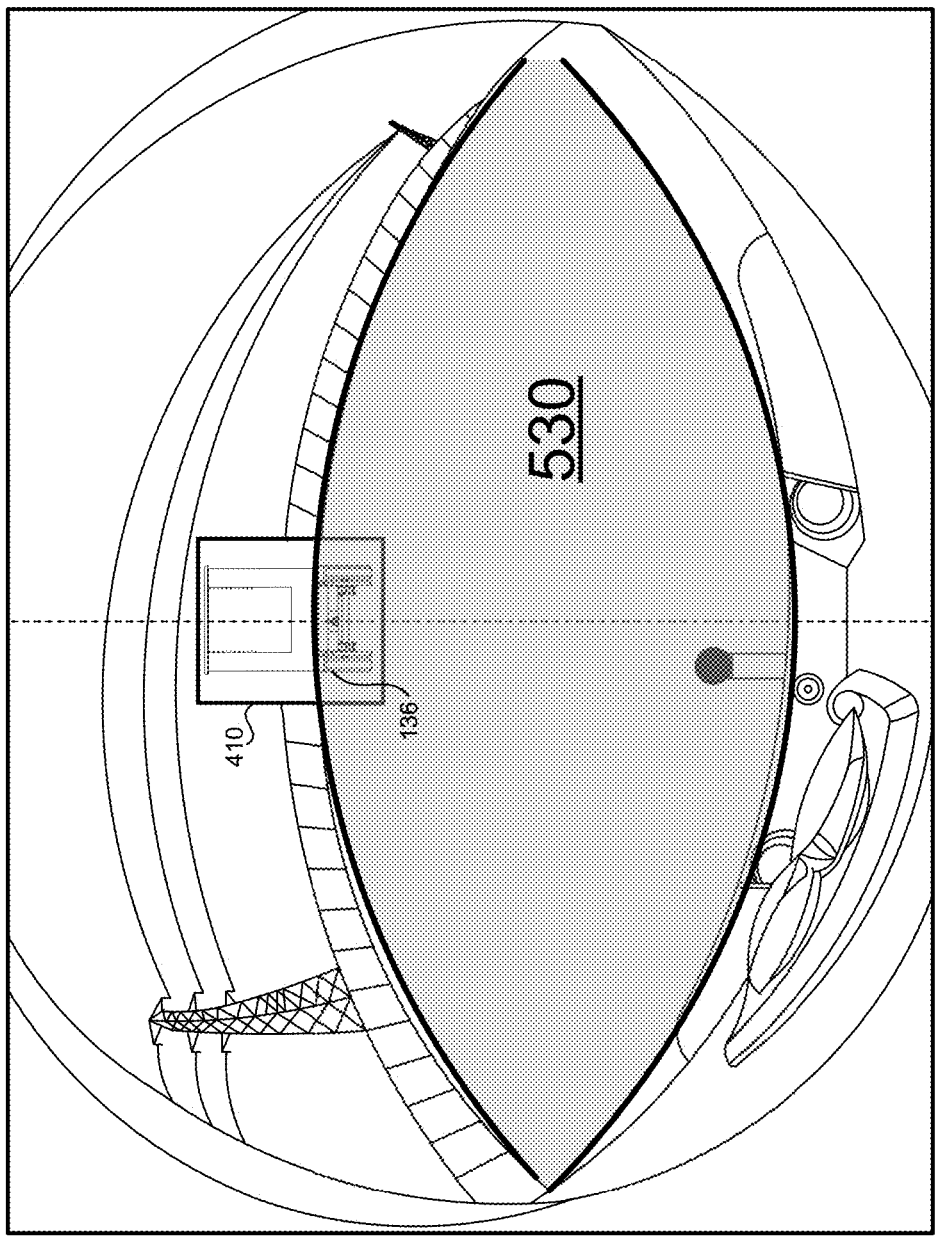
FIG. 5A is a schematic view of an exemplary image of a trailer captured by a rear vehicle camera.

FIG. 5 shows a method 500 executed by the ROI proposal determiner 182 to determine one or more ROI proposals 400p based on received images 144 and automatically detect the coupler-tow-bar combination 210 or the trailer 200 within the received images 144 by way of applying a tight fit bounding box (ROI) around the coupler-tow-bar combination 210 or the trailer 200. At block 502, the ROI proposal determiner 182 receives one or more images 144. At block 504, the ROI proposal determiner 182 analyzes the received images 144 and determines a valid area for analysis. For example, referring to FIG. 5A, for coupler 212 detection, the ROI proposal determiner 182 determines the valid region 530 based on camera calibration to exclude the area above horizon and the area that includes the body of the tow vehicle 100. Similarly, for trailer detection, the ROI proposal determiner 182 determines the valid region 530 based on camera calibration to exclude the area above the trailer 200 and the area below the trailer 200.

Following, the ROI proposal determiner 182 may execute one of three methods to determine the ROI proposal 400p (i.e., the ROI proposals 400p may include coupler ROI 400c or trailer ROI 400t). Method 1: at block 506, the ROI proposal determiner 182 iteratively applies the learned filter banks 322 (i.e., MCCF) over a series of scanning windows covering the image region 530 until a maximum peak is discovered. The first method is known as a brutal force search method and may be used when runtime is not an issue).

Method 2: The ROI proposal determiner 182 may execute method 2 for determining ROI proposals 520. At block 508, the ROI proposal determiner 182 segments the received region 530 of images 144 using SLIC (Simple Linear Iterative Clustering) to find superpixels first, then builds a RAG (Region Adjacent Graph) to merge regions with similarities. Pixel Similarity may be based on Intensity, Distance, Color, Edges and Texture. At block 510, the ROI proposal determiner 182 constructs a region adjacency graph (RAG) based on the segmentation of block 508. The RAG is a data structure used for segmentation algorithms and provides vertices that represent regions and edges represent connections between adjacent regions.

At block, 512 the ROI proposal determiner 182 merges regions within the determined region 530 of the image 144. For example, if two adjacent pixels are similar, the ROI proposal determiner 182 merges them into a single region. If two adjacent regions are collectively similar enough, the ROI proposal determiner 182 merge them likewise. The merged region is called a super-pixel. This collective similarity is usually based on comparing the statistics of each region.

At block 514, the ROI proposal determiner 182 identifies possible trailer super-pixels. A super-pixel qualifies as a trailer region of interest if it has minimum and maximum size constraints and excludes irregular shape based on a predetermined trailer type. At block 516, the detection module 310 identifies and merges possible trailer super-pixels based on estimated trailer shape and size at particular image locations to obtain ROI Proposals 400p. The ROI proposal determiner 182 associates these ROI proposals 400p with the trained MCCF filters 322 to find the peak energy for automatic pixel location of the center $L_{CCP}$ of the coupler 212 (FIG. 4A) or the pixel location $L_{TCP}$ of the trailer bottom center at the tow-bar 214 (FIGS. 4B and 4C).

Method 3: The ROI proposal determiner 182 may execute method 3 for determining ROI proposals 520. At block, 518 the ROI proposal determiner 182 may use any other object detection and classification methods which may generalize the detection of a number of coupler-tow-bar combinations 210 or trailers 200, but unable to identify a specific preferred trailer in a trailer park. In some examples, Deep Neural network (DNN) or other generalization methods may be used but cannot identify a specific trailer type. The ROI proposals 520 may be provided by other vision-based object detection and classification methods. The ROI proposals 400p may also be determined by other sensors such as radar or lidar if available. Multiple ROI proposal methods may be combined to reduce false positive ROI proposals 400p.

Trailer and Coupler Detector 184

Figure 6:
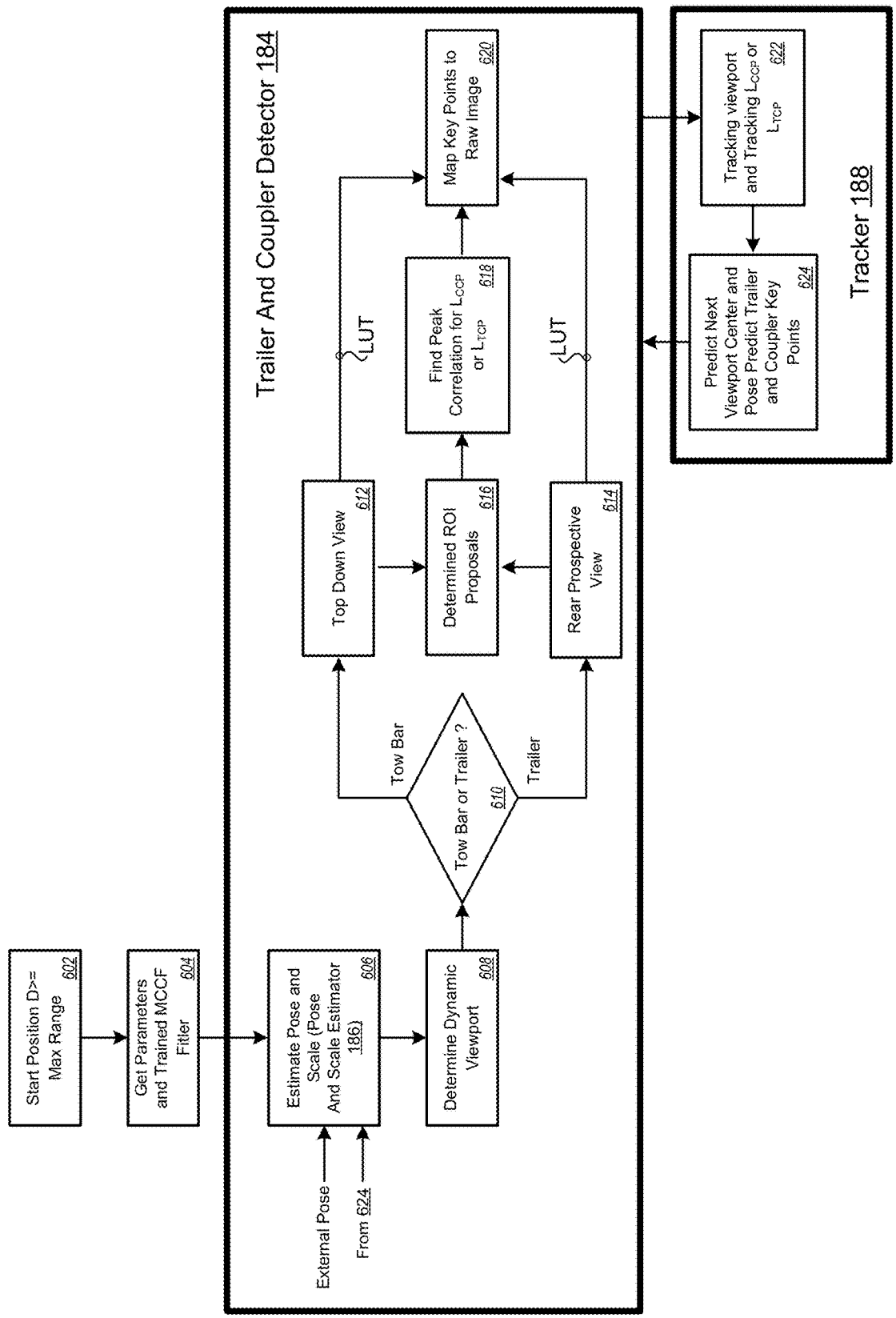
FIG. 6 is a schematic view of an exemplary trailer coupler detector and an exemplary tracker.

FIG. 6 shows a flow chart of the trailer and coupler detector 184 while the tow vehicle 100 approaches the trailer 200. At block 602, the start position of the tow vehicle 100 is usually within a distance D in meters from the trailer 200. At block 604, the trailer and coupler detector 184 receives parameters and trained MCCF filters 322 from the memory hardware 152 (stored by the trained phase). The parameters may include, but are not limited to, as camera intrinsic and extrinsic calibration information, tow vehicle configurations such as a distance between the tow-ball 122 and a front axle of the tow vehicle, wheel base of the tow vehicle and tow-ball initial height, and trailer configurations such as width of the trailer 200, distance between the coupler 212 and trailer wheel center. Camera intrinsic parameters may include, focal length, image sensor format, and principal point, while camera extrinsic parameters may include the coordinate system transformations from 3D world coordinates to 3D camera coordinates, in other words, the extrinsic parameters define the position of the camera center and the heading of the camera in world coordinates. At block 606, the trailer and coupler detector 184 may receive pose estimation of the trailer 200 or coupler-tow-bar combination 210 from other modules or a pose and scale estimator 186 may estimate a pose and scale of the trailer 200 or coupler-tow-bar combination 210 based on the MCCF 322 iteratively to discover the maximum correlation energy between trained filters and the trailer and coupler region of interests at specific viewport pose and viewport center.

Then at block 608, the trailer and coupler detector 184 determines a dynamic viewport by adjusting the center of the viewport and rotation angle (pitch, yaw, roll) of the viewport, so that the rectified image 146 appears to be similar to the trained pattern (i.e., ROI 400c, 400t shown in FIGS. 4A-C) that have a known orientation. Referring to FIGS. 7A-7D, by changing the viewport center distance from the camera and view angle such as pitch and yaw, the appearance of the trailer will change until it matches the trained pattern (i.e., ROI 400c, 400t shown in FIGS. 4A-C) where the maximum correlation energy is reached. In the real world, the trailer 200 and tow vehicle 100 are not perfectly aligned with zero orientation angle between them, and the distance between the trailer 200 and tow vehicle 100 varies too. The viewports 700 for top down and forward view are defined with center at (x, y, z) with unit in mm (millimeter) in the world coordinate system. The size of the viewport 700 is defined in (width_mm×height_mm), as well as (width_px×height_px) with pitch, yaw and roll rotation angles relative to the autosar (AUTomotive Open System ARchitecture) vehicle coordinate system. The millimeter per pixel and pixel per millimeter of the image can be calculated. If the rectification viewport 700 center is fixed, the scale estimation is needed. The rectification viewport center can be adaptive in a way that the trailer size in the rectified image is the same size of single channel of the learned filter. Scale estimated can be avoided by changing the viewport center. If the truck and trailer is not perfectly aligned in real world, the rectification viewport yaw angle can be adaptive so that the appearance of trailer in forward view maintains same orientation and appearance as the training patch. The viewport yaw angle can be determined iteratively through finding the peak correlation energy with the trained filter During trailer key point localization, in order to maintain the same size as the single channel learned filter of trailer within rectified image, a series of virtual cameras placed in viewport center in each frame.

Figure 7D:
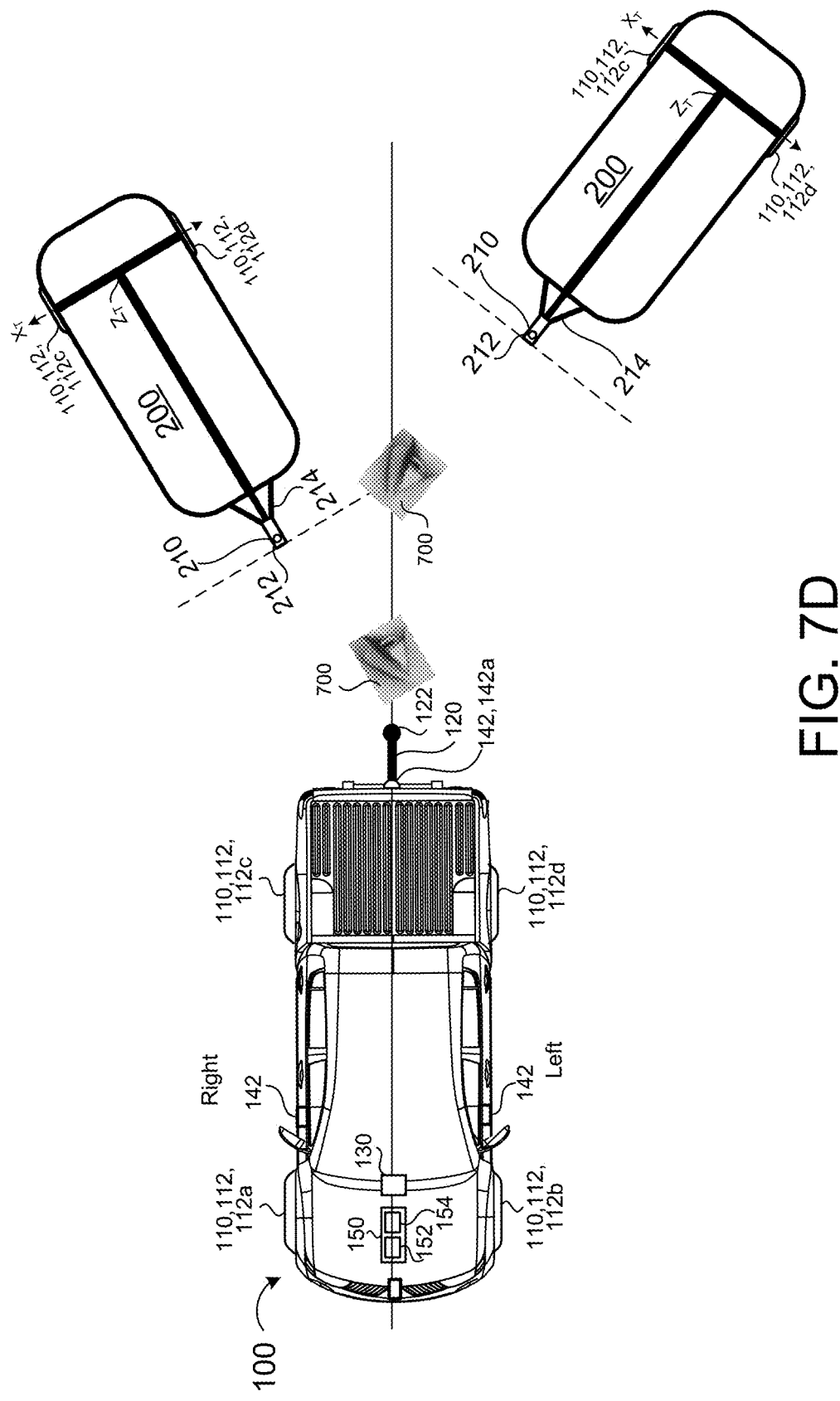
FIG. 7D is a schematic top view of a trailer positioned behind the vehicle showing the different positions of a viewport.

The dynamic viewport 700 is configured to adjust the viewing distance which is the longitudinal distance of the viewport center from the camera 142a and the view angle which is viewport rotation angles (it is also called viewport pose) such as the pitch, yaw and roll. Therefore, the appearance of the trailer 200 changes based on viewports 700 with different center location and pose configurations. Thus, at block 608, the detector 184 adjusts the viewport of the current image 144 so that it matches the trained ROI 400. FIG. 7A shows that the viewport is at a middle distance between the tow vehicle 100 and the trailer 200. FIG. 7B shows that the viewport is at a closer distance relative to the middle distance. In addition, FIG. 7C shows that the viewport captures the tow vehicle 100 and the trailer 200 attached. FIG. 7D shows a top view illustration of different view center and view angles of the viewport 700. (The 'eye' location is viewport center, the direction of 'eye' is the viewport pose. The eye location may be indicative, for example, to a person standing between the camera 142a and the trailer 200 and looking at the trailer 200 or looking round.)

At block 610, the trailer and coupler detector 184 determines if it is detecting a coupler-tow-bar combination 210 or a trailer 200. Therefore, when the trailer and coupler detector 184 determines that it is detecting a coupler-tow-bar combination 210, then at block 612, the captured image 144 includes a top down view of the coupler-tow-bar combination 210 as previously shown in FIG. 4A. However, if the trailer and coupler detector 184 determines that it is detecting a trailer 200, then at block 614, the captures image 144 includes a perspective view of the trailer 200 as previously shown in FIGS. 4B and 4C.

Following, at block 616, the trailer and coupler detector 184 instructs the ROI proposal determiner 182 to determine trailer ROI proposals 400p or tow-bar-coupler ROI proposals 400p based on the decision of block 610. The trailer and coupler detector 184 also generates a lookup table (LUT) for each of the coupler-tow-bar combination 210 and the trailer 200 respectively, where the lookup table LUT includes entries from the dynamic viewport (determined at block 608) that correspond to pixel locations in the fisheye image 144.

At block 618, the trailer and coupler detector 184 determines a location of the peak correlation energy for the coupler center $L_{CCP}$ or the pixel location $L_{TCP}$ of the trailer bottom center at the tow-bar 214 the within ROI proposal 400p of the dynamic viewport image determined at block 608. Correlation energy refers to a measure of similarity between features of two images (such as between ROI proposal 400p image patch and pre-trained trailer patch 400 whose key point is at the bottom center of the trailer ($L_{TCP}$) and also at the peak of gaussian curve, or tow-bar-coupler patch gaussian-weighted at coupler center) as a function of the pixel location of one relative to another. The peak correlation energy in ROI proposal 400p corresponds to the gaussian-weighted key point in trained image patch 400. In some examples, the detector 184 executes method 800 shown in FIG. 8 to determine the peak correlation energy for the coupler center $L_{CCP}$ or the pixel location $L_{TCP}$ of the trailer bottom center at the coupler-tow-bar combination 210. At block 802, the detector 184 retrieves the ROI proposals 400p from memory hardware 154 which were determined by the determiner 182 and rescaled to the same size as the image patch used during the training phase. At block 802, the detector 184 executes a normalizing function on the ROI proposals 400p to reduce the lighting variations. At block 804, the detector 184 calculates multi-channel normalized HOG features similar to the method executed in FIG. 3 block 304. At block 806, the detector 184 applies cosine window to HOG channels and transforms them to frequency domain similar to the method of FIG. 3 block 310. At block 808, the detector 184 determines the correlation energy map as a function of pixel location between ROI proposal patch 400p and trained filter 322 in frequency domain and transforms back to image domain. At block 810, the detector 184 determines the coupler center $L_{CCP}$ or the pixel location $L_{TCP}$ of the trailer bottom center at the coupler-tow-bar combination 210 by finding the pixel location of the peak energy in the correlation energy map.

Referring back to FIG. 6, at block 620, the trailer and coupler detector 184 relies on the lookup table to map the coupler center $L_{CCP}$ or the pixel location $L_{TCP}$ of the trailer bottom center at the tow-bar 214 determined within the ROI proposal 400p of the dynamic viewport to the raw fisheye image 144.

Kalman MCCF tracker 188

At block 622, in some examples, the tracker 188 tracks the coupler center $L_{CCP}$ or the pixel location $L_{TCP}$ of the trailer bottom center at the coupler-tow-bar combination 210 within the fisheye image 144 based on the mapped coupler center $L_{CCP}$ or the pixel location $L_{TCP}$ of the trailer bottom center at the tow-bar 214 at block 620. The tracker 188 may include a Kalman MCCF Tracker, which is configured to track the viewport 700 and key points. At block 622, the tracker 188 tracks the viewport center and viewport pose as well as trailer bottom center $L_{TCP}$ and coupler center $L_{CCP}$ in raw image. At block 624, the tracker 188 predicts a viewport center and a viewport pose and predict an updated coupler center $L_{CCP}$ or the pixel location $L_{TCP}$ of the trailer bottom center at the coupler-tow-bar combination 210 in the new viewport from the predicted key points in raw image. The predicted viewport 700 may be used in block 186 as a reference to determine the next viewport pose and viewport center.

Confidence Calculation 190

In some implementations, the confidence calculation module 190 determines a confidence value associated with the tracked coupler center $L_{CCP}$ or the tracked pixel location $L_{TCP}$ of the trailer bottom center at the coupler-tow-bar combination 210. The confidence calculation module 190 may use the coupler center $L_{CCP}$ or the location $L_{TCP}$ of the trailer bottom center at the coupler-tow-bar combination 210 to determine a trailer 200 and a coupler-tow-bar combination 210 orientation in top view or 3D view to check the trailer pose confidence.

Additionally, the confidence calculation module 190 applies a cascade approach to determine key point localization confidence. First, the confidence calculation module 190 detects a trailer body, then the confidence calculation module 190 detects the coupler-tow-bar combination 210, the confidence calculation module 190 checks the constraints between two key points. Then the confidence calculation module 190 zooms in to take a close look at the coupler center $L_{CCP}$ and its surrounding features. The zoom ratio may be 1.5-2.5 as long as there are sufficient features that may be used to identify the coupler center $L_{CCP}$. The confidence calculation module 190 checks correlation energies and locations of the coupler center $L_{CCP}$ from cascade approach. Finally, the confidence calculation module 190 determines a high-resolution patch of the coupler itself and the confidence calculation module 190 analyzes its edge to ascertain the localization accuracy of the coupler center. The confidence calculation module 190 uses several methods to estimate the one metric to increase the confidence of localization accuracy. The one metric that the confidence calculation module 190 is trying to determine is the coupler center location $L_{CCP}$. Therefore, the confidence calculation module 190 analyzes the physical constraints and relationships within trailer-tow-bar-coupler combination, and the key point with varying sizes of texture and the confidence calculation module 190 also analyze the high-resolution edge feature of the coupler. Once the confidence calculation module 190 completes its analysis, the confidence calculation module 190 determines a confidence of the coupler center location $L_{CCP}$. If confidence is below a threshold, the hitching operation may be halted, or the algorithm may be reset to perform a wider search. The confidence calculation module 190 may analyze the history of the previously determined confidences to determine mismatch between trained filters 322 and actual trailer and tow-bar-coupler.

Adaptive Tow Ball Height Change Detector 192

Figure 9:
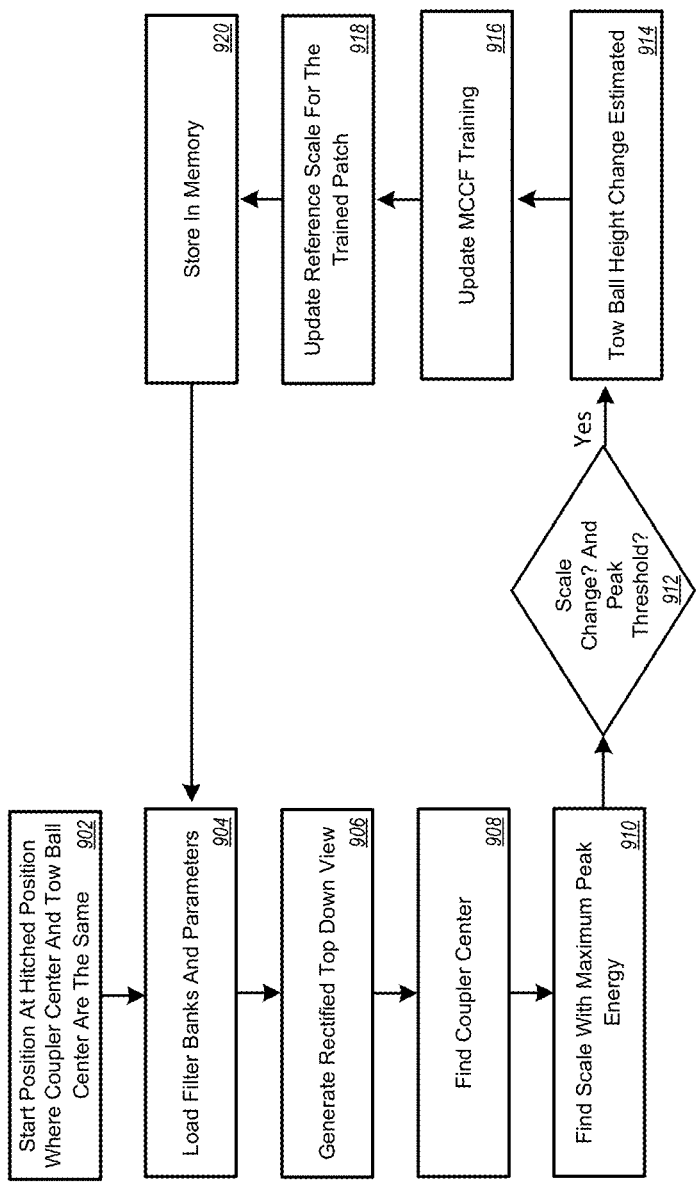
FIG. 9 is schematic view of an exemplary arrangement of operations executed by an adaptive tow ball height change detector.

Referring to FIG. 9, in some implementations, after the tow vehicle 100 is hitched to the trailer 200, the adaptive tow ball height change detector 192 determines if the scale (based on one or more captured images 144) of features of the attached coupler-tow-bar combination 210 are the same as the scale associated with a previously learned coupler-tow-bar combination 210.

Figure 8:
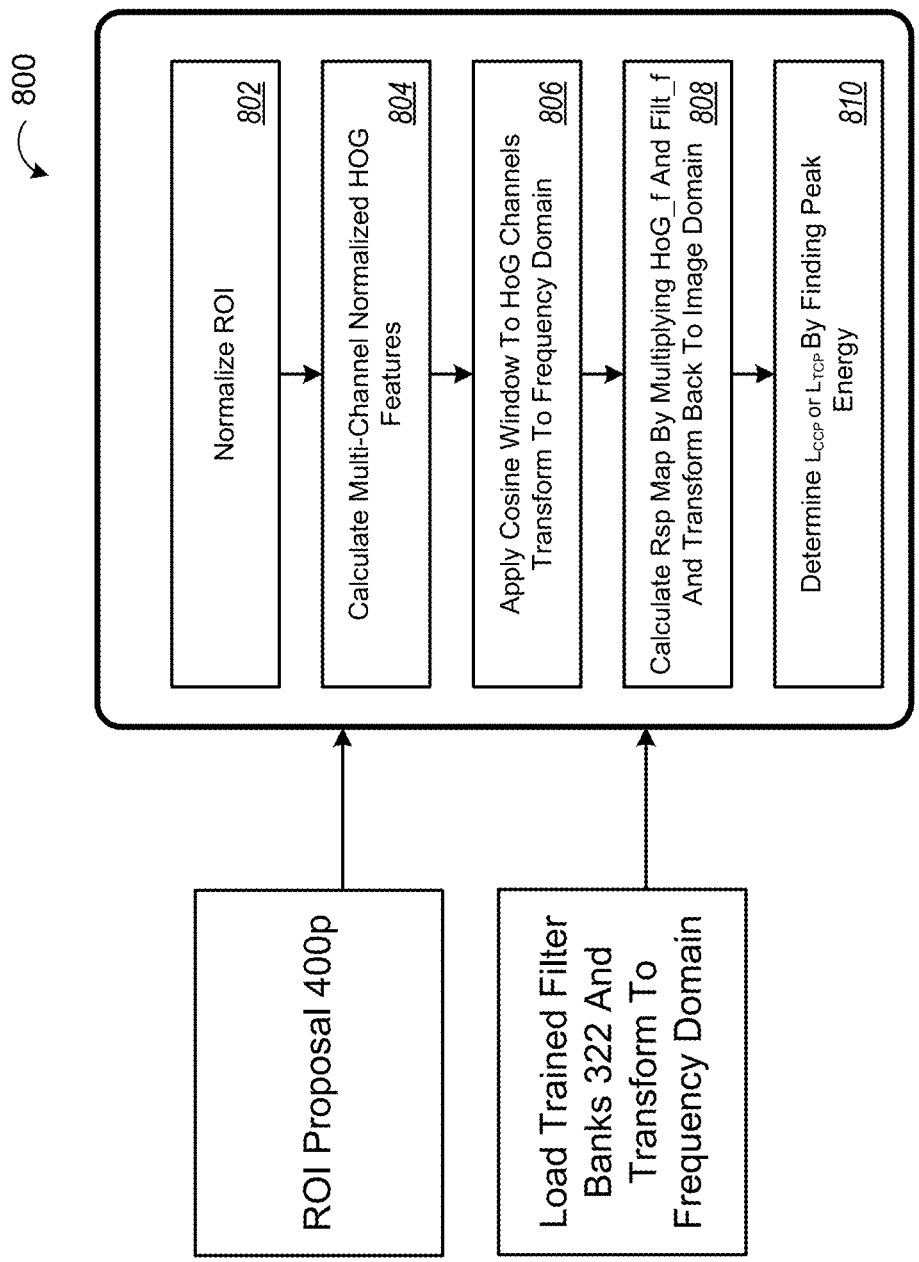
FIG. 8 is schematic view of an exemplary arrangement of operations for determining the location of the coupler and the center of the bottom portion of the trailer.

At block 902, the adaptive tow ball height change detector 192 receives an image 144 from the rear camera 142a of the tow vehicle 100 being attached to the trailer 200. Since the tow vehicle 100 is attached to the trailer 200, then the coupler center $L_{CCP}$ and the center of the vehicle tow ball 122 overlap. Since the image 144 is associated with the coupler-tow-bar combination 210, then the image is top-down image as shown in FIG. 4A. At block 904, the adaptive tow ball height change detector 192 loads learned filter banks 322 and parameters of the tow-bar from memory hardware 154. Following, at block 906, the adaptive tow ball height change detector 192 generates a rectified top-down view 146 of the image 144. At block 908, the adaptive tow ball height change detector 192 finds the coupler center by executing method 800 as shown in FIG. 8. At block 910 the adaptive tow ball height change detector 192 crops a number of image patches with different scale factors. The scale factor may be searched in an iterative manner in the direction where a larger correlation energy is discovered. These image patches are resized to the size of the patch (ROI 400) used during the training and learning phase 170 and then applied correlation with the trained filters 322. The scale factor of the image patches with maximum peak correlation energy will be selected. At block 912, the adaptive tow ball height change detector 192 determines if the scale of the features within the captured images 144 with the maximum peak energy is different from the scale of features associated with the trained ROI 400c and if the maximum peak energy is greater than a predetermined threshold. If one or both conditions are not met, then the adaptive tow ball height change detector 192 determines that the image 144 does not include a coupler-tow-bar combination 210 or that the scale of coupler-tow-bar combination 210 has not been changed. However, if both conditions are met, then at block 914, the adaptive tow ball height change detector 192 sets an indication flag to inform the driver that the tow ball height has changed, and therefore, the training data may be updated. At block 916, the adaptive tow ball height change detector 192 updates the filter banks 322 (i.e., MCCF) that were learned during the learning phase (FIG. 3). At block 918, the adaptive tow ball height change detector 192 updates the scale associated with the image patch used during the training and learning phase 170 where the training patch has a fixed dimension. At block 920, the adaptive tow ball height change detector 192 stored the updated filter banks 322 in memory hardware 154. Therefore, the adaptive tow ball height change detector 192 is a procedure to synchronize the scale of the tow-bar-coupler patch to the current tow ball height for a safety feature to prevent the tow ball 122 and coupler 212 from colliding with each other during hitching.

Once it is synchronized, a similar procedure with safety feature may be performed while the coupler 212 and tow ball 122 are apart within, for example, one meter from each other, to determine if the coupler 212 is higher or lower than the tow ball 122 to prevent the coupler 212 and tow ball 122 from colliding with each other during hitching process. This process is also referred to as relative height determination.

Real World Position Estimation Module 194

The real-world position estimation module 194 determines the position of the trailer coupler 212 determined by the tracker 188 in world coordinate system. The viewport center is a three-dimensional coordinate. If the same scale is maintained in each image frame during operation and the physical width in 3D of the trailer 200 is known, the relationship between 3D coordinates of the trailer 200 and the viewport center may be determined. This 3D distance estimation method for trailer relying on texture width as well as real world trailer width is robust to situations where uneven surfaces is present such as beach, dirt road, grass. Furthermore, the fixed distance between trailer bottom center $L_{TCP}$ at tow-bar and coupler center in real world is another useful constraint to optimize the 3D distance estimation of coupler center and coupler height.

Therefore, once the real-world position estimation module 194 determines the real-world position of the trailer coupler 212, then the real world position estimation module 194 sends a drive assist system 196. Based on the received real world location, the drive assist system 196 determines a path between the tow vehicle 100 and the trailer 200 leading the tow vehicle 100 to align with the trailer 200 for hitching. In addition, the drive assist system 196 sends the drive system 110 one or more commands 198 causing the drive system 110 to autonomously maneuver the tow vehicle 100 in a rearwards direction $R_v$ towards the trailer 200. In some examples, the drive assist system 196 instructs the drive system 110 to position the tow vehicle 100 such that the fore-aft axis $Y_v$ of the tow vehicle 100 and the fore-aft axis $Y_T$ of the trailer 200 are coincident.

Figure 10:
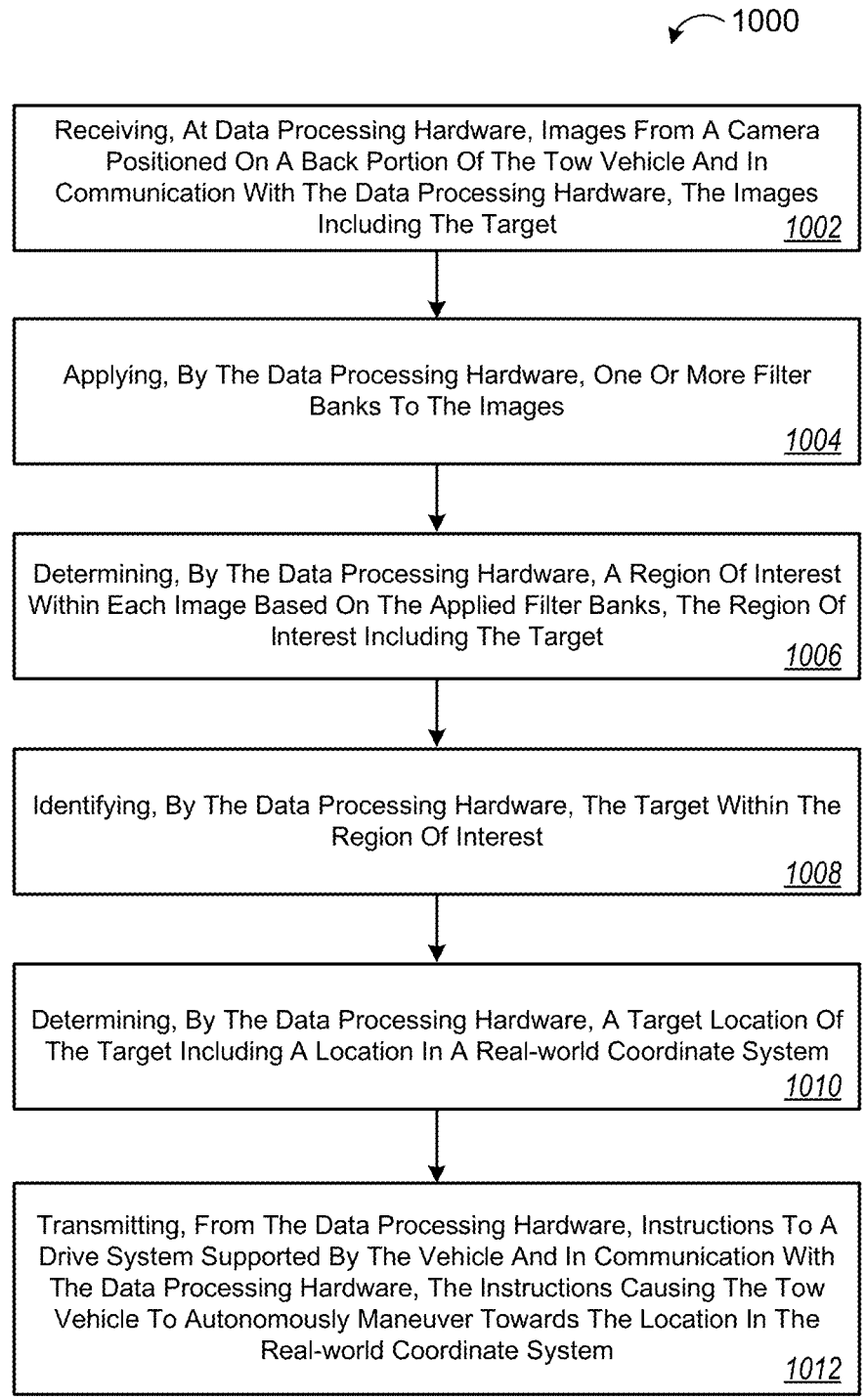
FIG. 10 is schematic view of an exemplary arrangement of operations for determining a target and causing a tow vehicle to drive towards the target.

FIG. 10 provides an example arrangement of operations of a method 1000 for determining a location of a target 200, 210, 212, 214 (e.g., the trailer 200, a coupler-tow-bar combination 210, a coupler 212, and a tow-bar 214) positioned behind a tow vehicle 100 using the system described in FIGS. 1-9. At block 1002, the method 1000 includes receiving, at data processing hardware 152, images 144 from a camera 142a positioned on a back portion of the tow vehicle 100. The camera 142a may include a fisheye camera. The images 144 including the target 200, 210, 212, 214. At block 1004, the method 1000 includes, applying, by the data processing hardware 152, one or more filter banks 322 to the images 144. The filter banks 322 stored in memory hardware 154 in communication with the data processing hardware 152. At block 1006, the method 1000 includes determining, by the data processing hardware 152, a region of interest (ROI) 400, 400c, 400t within each image 144 based on the applied filter banks 322. The ROI 400, 400c, 400t including the target 200, 210, 212, 214. At block 1008, the method 1000 includes identifying, by the data processing hardware 152, the target 200, 210, 212, 214 within the ROI 400, 400c, 400t. At block 1010, the method 1000 includes, determining, by the data processing hardware 152, a target location $L_{CCP}$, $L_{TCP}$ of the target 200, 210, 212, 214 including a location in a real-world coordinate system. At block 1012, the method 1000 includes transmitting, from the data processing hardware 152, instructions 195, 198 to a drive system 110 supported by the tow vehicle 100 and in communication with the data processing hardware 152. The instructions 195, 198 causing the tow vehicle 100 to autonomously maneuver towards the location of the target 200, 212, 214 in the real-world coordinate system.

In some implementations, the method 1000 includes: tracking, by the data processing hardware 152, the target 200, 210, 212, 214 while the tow vehicle 100 autonomously maneuvers towards the identified target 200, 210, 212, 214; and determining, by the data processing hardware 152, an updated target location $L_{CCP}$, $L_{TCP}$. The method 1000 may also include transmitting, from the data processing hardware 152, updated instructions 195, 198 to the drive system 110. The updated instructions 195, 198 causing the tow vehicle 100 to autonomously maneuver towards the updated target location $L_{CCP}$, $L_{TCP}$. In some examples, where the camera 142a is a fisheye camera, the method 1000 further includes rectifying, by the data processing hardware 152, the fisheye images 144 before applying the one or more filter banks 322.

In some implementations, the method 1000 includes receiving, at the data processing hardware 152, training images 144 stored in hardware memory 154 in communication with the data processing hardware 152. The method 1000 may also include determining, by the data processing hardware 152, a training ROI 400, 400c, 400t within each received image, the training ROI 400, 400c, 400t including a target 200, 210, 212, 214. The method 1000 may include determining, by the data processing hardware 152, the one or more filter banks 322 within each training ROI 400, 400c, 400t. In some examples, the method 1000 further includes identifying, by the data processing hardware 152, a center of the target, wherein the target location $L_{CCP}$, $L_{TCP}$ includes a location of the center of the target.

In some implementations, the target 200, 210, 212, 214 is a coupler 212 of a coupler-tow-bar combination 210 supported by a trailer 200. Therefore, the images 144 are a top-down view of the coupler-tow-bar combination 210 as shown in FIG. 4A.

In some implementations, the target 200, 210, 212, 214 is a trailer 200 positioned behind the tow vehicle 100 and the target location $L_{TCP}$ is a location of a trailer bottom center at a tow-bar 214. Therefore, the images 144 are a perspective view of the trailer 200.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method for determining a location of a target positioned behind a tow vehicle, the method comprising:
   receiving, at data processing hardware, images from a camera positioned on a back portion of the tow vehicle and in communication with the data processing hardware, the images including the target;
   adjusting, by the data processing hardware, the received images such that an appearance of the target within the image matches an orientation of a training target within a training region of interest;
   applying, by the data processing hardware, one or more filter banks to the adjusted images, the one or more filter banks including characteristics of the target that are learned during a learning phase by analyzing one or more training images, each training image including at least one training region of interest;
   determining, by the data processing hardware, a region of interest within each image based on the applied filter banks, the region of interest including the target;
   identifying, by the data processing hardware, the target within the region of interest;
   determining, by the data processing hardware, a target location of the target identified within the region of interest, the target location including a location of the target in a real-world coordinate system; and
   transmitting, from the data processing hardware, instructions to a drive system supported by the vehicle and in communication with the data processing hardware, the instructions causing the tow vehicle to autonomously maneuver towards the location of the target in the real-world coordinate system.

2. The method of claim 1, further comprising:
   tracking, by the data processing hardware, the target while the tow vehicle autonomously maneuvers towards the identified target;
   determining, by the data processing hardware, an updated target location; and
   transmitting, from the data processing hardware, updated instructions to the drive system, the updated instructions causing the tow vehicle to autonomously maneuver towards the updated target location.

3. The method of claim 1, wherein the camera includes a fisheye camera capturing fisheye images.

4. The method of claim 3, further comprising rectifying, by the data processing hardware, the fisheye images before applying the one or more filter banks.

5. The method of claim 1, further comprising:
   receiving, at the data processing hardware, training images stored in hardware memory in communication with the data processing hardware;
   determining, by the data processing hardware, a training region of interest within each received image, the training region of interest including a target; and
   determining, by the data processing hardware, the one or more filter banks within each training region of interest.

6. The method of claim 5, further comprising: identifying, by the data processing hardware, a center of the target, wherein the target location includes a location of the center of the target.

7. The method of claim 1, wherein the target is a coupler of a tow-bar-coupler supported by a trailer.

8. The method of claim 7, wherein the images are a top-down view of the tow-bar-coupler.

9. The method of claim 1, wherein the target is a trailer positioned behind the tow vehicle and the target location is a location of a trailer bottom center at a tow-bar.

10. The method of claim 9, wherein the images are a perspective view of the trailer.

11. A system for determining a location of a target positioned behind a tow vehicle, the system comprising:
    data processing hardware; and
    memory hardware in communication with the data processing hardware, the memory hardware storing instructions that when executed on the data processing hardware cause the data processing hardware to perform operations comprising:
      receiving images from a camera positioned on a back portion of the tow vehicle and in communication with the data processing hardware, the images including the target;

adjusting the received images such that an appearance of the target within the image matches an orientation of a training target within a training region of interest;

applying one or more filter banks to the adjusted images, the one or more filter banks include characteristics of the target that are learned during a learning phase by analyzing one or more training images, each training image including at least one training region of interest;

determining a region of interest within each image based on the applied filter banks, the region of interest including the target;

identifying the target within the region of interest;

determining a target location of the target identified within the region of interest, the target location including a location in a real-world coordinate system; and transmitting instructions to a drive system supported by the vehicle and in communication with the data processing hardware, the instructions causing the tow vehicle to autonomously maneuver towards the location of the target in the real-world coordinate system.

12. The system of claim 11, wherein the operations further comprise:

tracking the target while the tow vehicle autonomously maneuvers towards the identified target;

determining an updated target location; and transmitting updated instructions to the drive system, the updated instructions causing the tow vehicle to autonomously maneuver towards the updated target location.

13. The system of claim 11, wherein the camera includes a fisheye camera capturing fisheye images.

14. The system of claim 13, wherein the operations further comprise rectifying the fisheye images before applying the one or more filter banks.

15. The system of claim 11, wherein the operations further comprise:

receiving training images stored in hardware memory in communication with the data processing hardware;

determining a training region of interest within each received image, the training region of interest including a target; and determining the one or more filter banks within each training region of interest.

16. The system of claim 15, wherein the operations further comprise identifying a center of the target, wherein the target location includes a location of the center of the target.

17. The system of claim 11, wherein the target is a coupler of a tow-bar-coupler supported by a trailer.

18. The system of claim 17, wherein the images are a top-down view of the tow-bar-coupler.

19. The system of claim 11, wherein the target is a trailer positioned behind the tow vehicle and the target location is a location of a trailer bottom center at a tow-bar.

20. The system of claim 19, wherein the images are a perspective view of the trailer.

* * * * *